US011019475B2

(12) United States Patent
Baldree

(10) Patent No.: US 11,019,475 B2
(45) Date of Patent: *May 25, 2021

(54) MOBILE DEVICE ATTACHMENT WITH USER ACTIVATED ALARM

(71) Applicant: Katana Safety, Inc., Greenville, SC (US)

(72) Inventor: Todd W. Baldree, Greer, SC (US)

(73) Assignee: Katana Safety, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,783

(22) Filed: Apr. 9, 2020

(65) Prior Publication Data

US 2020/0245124 A1 Jul. 30, 2020

Related U.S. Application Data

(63) Continuation of application No. 16/435,379, filed on Jun. 7, 2019, now Pat. No. 10,659,946, which is a
(Continued)

(51) Int. Cl.
*H04W 4/02* (2018.01)
*G08B 21/02* (2006.01)
(Continued)

(52) U.S. Cl.
CPC .......... *H04W 4/90* (2018.02); *G08B 13/1427* (2013.01); *G08B 21/0213* (2013.01);
(Continued)

(58) Field of Classification Search
CPC ....... H04W 4/008; H04W 12/06; H04W 4/02; H04W 4/22; H04W 76/007;
(Continued)

(56) References Cited

U.S. PATENT DOCUMENTS 4,908,607 A 3/1990 Yannotti et al.
5,742,233 A 4/1998 Hoffman et al.
(Continued)

FOREIGN PATENT DOCUMENTS

CN 203299980 U 11/2013
CN 103858154 A 6/2014
(Continued)

OTHER PUBLICATIONS

Chinese Patent Application No. 201780053428.4, Notification of First Office Action, dated Jun. 22, 2020, 29 pages.
(Continued)

*Primary Examiner* — Philip Sobutka
(74) *Attorney, Agent, or Firm* — Fish & Richardson P.C.

(57) ABSTRACT

The subject matter of this specification can be embodied in, among other things, a mobile device accessory that includes a first housing defining a first attachment surface that is configured to adhere to another surface, a user input mechanism configured to activate in response to input by a user of the mobile device, and circuitry configured to activate in response to activation of the user input mechanism, wherein activation of the circuitry (i) causes an audible alarm to be emitted by the mobile device, or (ii) causes a software application to be executed on a mobile device, or (iii) both.

31 Claims, 40 Drawing Sheets

Related U.S. Application Data continuation-in-part of application No. 16/163,434, filed on Oct. 17, 2018, now Pat. No. 10,462,641, which is a continuation of application No. 15/642,267, filed on Jul. 5, 2017, now Pat. No. 10,111,079.

(60) Provisional application No. 62/358,996, filed on Jul. 6, 2016.

(51) Int. Cl.
| | | |
|---|---|---|
| *H04W 4/90* | (2018.01) | |
| *H04W 4/029* | (2018.01) | |
| *G08B 13/14* | (2006.01) | |
| *H04W 4/80* | (2018.01) | |
| *H04B 1/3827* | (2015.01) | |
| *H04M 1/72412* | (2021.01) | |

(52) U.S. Cl.
CPC ......... *G08B 21/0286* (2013.01); *H04B 1/385* (2013.01); *H04M 1/72412* (2021.01); *H04W 4/029* (2018.02); *H04W 4/80* (2018.02); *G08B 13/1463* (2013.01); *H04B 2001/3861* (2013.01)

(58) Field of Classification Search
CPC ............... H04M 1/7253; H04M 11/04; H04M 1/72516; G08B 13/1427; G08B 25/016; G08B 21/0213; G08B 15/004
USPC .. 455/575.6, 404.1, 404.2, 521, 414.1, 41.2, 455/575.1
See application file for complete search history.

(56) References Cited

U.S. PATENT DOCUMENTS

| | | | |
|---|---|---|---|
| 5,796,338 A | 8/1998 | Mardirossian | |
| 6,044,257 A | 3/2000 | Boling et al. | |
| 6,226,510 B1 | 5/2001 | Boling et al. | |
| 6,239,700 B1 | 5/2001 | Hoffman et al. | |
| 6,340,928 B1 | 1/2002 | McCurdy | |
| 6,535,127 B1 | 3/2003 | Taylor | |
| 6,624,754 B1 | 9/2003 | Hoffman et al. | |
| 6,636,732 B1 | 10/2003 | Boling et al. | |
| 6,864,789 B2 | 3/2005 | Wolfe | |
| 7,038,590 B2 | 5/2006 | Hoffman et al. | |
| 7,091,866 B2 | 8/2006 | Nishibori | |
| 7,251,471 B2 | 7/2007 | Boling et al. | |
| 7,486,194 B2 | 2/2009 | Stanners et al. | |
| 7,602,303 B2 | 10/2009 | Douglas et al. | |
| 7,715,831 B2 | 5/2010 | Wakefield | |
| 8,013,734 B2 | 9/2011 | Saigh et al. | |
| 8,461,983 B2 | 6/2013 | McCauley | |
| 8,472,915 B2 | 6/2013 | Diperna et al. | |
| D689,499 S | 9/2013 | Chen et al. | |
| 8,665,106 B2 | 3/2014 | Heidvall et al. | |
| D718,316 S | 11/2014 | Veltz et al. | |
| D742,385 S | 11/2015 | Chaney | |
| D743,407 S | 11/2015 | Lin | |
| 9,183,731 B1 | 11/2015 | Bokhary | |
| 9,196,139 B2 | 11/2015 | Gutierrez et al. | |
| 9,201,456 B2 | 12/2015 | Eldershaw et al. | |
| 9,390,614 B2 | 7/2016 | Cruver et al. | |
| 9,443,410 B1 | 9/2016 | Constien | |
| 9,451,061 B2 | 9/2016 | Hagenstad | |
| D768,638 S | 10/2016 | Lee et al. | |
| 9,589,447 B2 | 3/2017 | Remer | |
| 9,615,235 B2 | 4/2017 | Scully et al. | |
| D787,497 S | 5/2017 | Friedland et al. | |
| 9,647,887 B2 | 5/2017 | Aminzade | |
| 9,817,948 B2 | 11/2017 | Swank | |
| D815,100 S | 4/2018 | Burmester | |
| D818,525 S | 5/2018 | Burmester | |
| D820,267 S | 6/2018 | Collins et al. | |
| 10,111,079 B2 * | 10/2018 | Baldree | H04M 1/7253 |
| 10,445,469 B2 | 10/2019 | Swank | |
| 10,462,641 B2 * | 10/2019 | Baldree | H04W 4/90 |
| 10,659,946 B2 * | 5/2020 | Baldree | G08B 13/1427 |
| 2004/0203570 A1 | 10/2004 | Berger | |
| 2005/0287981 A1 | 12/2005 | Hill | |
| 2007/0182548 A1 * | 8/2007 | Raad | G08B 21/0269 340/539.13 |
| 2007/0224980 A1 | 9/2007 | Wakefield | |
| 2007/0293186 A1 | 12/2007 | Lehmann | |
| 2008/0214111 A1 | 9/2008 | Moshir et al. | |
| 2009/0191839 A1 | 7/2009 | Cannon | |
| 2010/0330952 A1 | 12/2010 | Yeoman | |
| 2013/0033364 A1 | 2/2013 | Raz | |
| 2013/0225127 A1 | 8/2013 | Cavacuiti et al. | |
| 2013/0271264 A1 * | 10/2013 | Page | G08B 25/08 340/6.1 |
| 2015/0048943 A1 | 2/2015 | Chen | |
| 2015/0318885 A1 | 11/2015 | Earle | |
| 2016/0063847 A1 | 3/2016 | Hawkins | |
| 2016/0110990 A1 | 4/2016 | Cruver | |
| 2016/0174025 A1 | 6/2016 | Chaudhri | |
| 2016/0307007 A1 | 10/2016 | Narasimha | |
| 2017/0134063 A1 * | 5/2017 | Lee | H04M 1/04 |

FOREIGN PATENT DOCUMENTS

| | | |
|---|---|---|
| CN | 105308534 A | 2/2016 |
| CN | 105430181 A | 3/2016 |
| WO | WO2013023091 A2 | 2/2013 |

OTHER PUBLICATIONS

"Nio Bluetooth security tag review: your phone's new muscle", engadget, downloaded from the Internet Apr. 19, 2017, https://www.engadget.com/2009/10/14/nio-bluetooth-security-tag-review-your-phones-new-muscl/, 15 pages.

International Application No. PCT/US2020/036476, Notification of Transmittal of the International Search Report and the Written Opinion of the International Searching Authority, dated Nov. 20, 2020, 18 pages.

* cited by examiner

MOBILE DEVICE ATTACHMENT WITH USER ACTIVATED ALARM

CROSS-REFERENCE TO RELATED APPLICATIONS

This application is a continuation of U.S. application Ser. No. 16/435,379, filed Jun. 7, 2019, which is a continuation-in-part application of and claims priority to U.S. application Ser. No. 16/163,434, filed Oct. 17, 2018, which is a continuation of U.S. application Ser. No. 15/642,267, filed Jul. 5, 2017, which claims the benefit of U.S. Application Ser. No. 62/358,996, filed Jul. 6, 2016, the disclosures of which are incorporated by reference.

TECHNICAL FIELD

The present disclosure relates to a mobile device accessory, for example, one that includes an alarm device for personal protection purposes.

BACKGROUND

Personal safety remains a challenge for essentially all people. Over the course of one's life, there may be situations in which he or she feels that his or her personal safety is at risk. Because many people now routinely carry a mobile device (e.g., a mobile phone), a person who believes that his or her personal safety is at risk can use the device to manually contact (e.g., by text message or phone call) someone else, for example, the police or other entity, to alert them to the person's current situation. In this way, help can be summoned to assist the person whose safety is at risk.

SUMMARY

In general, this document describes a mobile device accessory that includes, e.g., an alarm device for personal protection purposes.

In a first aspect, a mobile device accessory includes a first housing defining a first attachment surface that is configured to adhere to another surface, a user input mechanism configured to activate in response to input by a user of the mobile device, and circuitry configured to activate in response to activation of the user input mechanism, wherein activation of the circuitry (i) causes an audible alarm to be emitted by the mobile device, or (ii) causes a software application to be executed on a mobile device, or (iii) both.

Various embodiments can include some, all, or none of the following features. The user input mechanism can also include a connector configured to be activated in response to at least partial removal of the connector by using a fingernail slot in the connector. The user input mechanism can also include a connector configured to be activated in response to at least partial removal of the connector from the first housing when subjected to a predetermined removal force, and the mobile device accessory can also include a wearable component comprising a lanyard configured to mechanically attach to the connector and to provide at least the predetermined removal force to the connector based on a pull of upon the lanyard and at least partly remove the connector from the first housing based on the pull. The software application can include instructions stored in a memory device of the mobile device, that when executed by a data processing apparatus of the mobile device cause the mobile device to perform operations comprising sending, in response to activation of the connectivity sensor, a communication to one or more recipients. The operations can also include determining, by the mobile device, a location of the mobile device, wherein the communication includes location data that is descriptive of the determined location. The user input mechanism can include a first button, and actuation of the input mechanism can include actuation of the first button. The first housing can define a first lateral surface arranged substantially perpendicular to the first attachment surface, and the first button is arranged on the first lateral surface. The first housing can define a second lateral surface arranged substantially perpendicular to the first attachment surface opposite the first lateral surface, and the user input mechanism can also include a second button arranged on the second lateral surface opposite the first button. Actuation of the user input mechanism can include substantially simultaneous actuation of the first button and the second button. The mobile device accessory can also include an adhesive pad configured to adhere the first attachment surface to the other surface. The first housing can include a cavity configured to retain one or more credit cards or identification cards.

The mobile device accessory of claim 1, further comprising a second housing comprising a second attachment surface configured to mechanically engage the first attachment surface and a third attachment surface configured to mechanically engage a mobile device, and defining a cavity configured to retain one or more credit cards or identification cards. The mobile device accessory can also include a speaker in the first housing that is configured to emit an audible alarm in response to activation of the alarm device.

In a second aspect, a mobile device accessory includes (a) a first housing defining a first attachment surface that is configured to adhere to another surface, (b) a user input mechanism at least partially in the housing and configured to activate in response to input by a user of the mobile device, and (c) control circuitry to control operation of the mobile device accessory, the control circuitry at least partly disposed in the first housing and configured to perform operations including (i) establish a communications connection to a mobile device, (ii) detect activation of the user input mechanism, and (iii) in response to the activation, (a) cause an audible alarm to be emitted by the mobile device, or (b) cause a software application to be executed on the mobile device, or (c) both.

Various embodiments can include some, all, or none of the following features. The communications connection to the mobile device can include a wireless connection. The wireless connection can include a BLUETOOTH connection. Controlling operation of the mobile device can include communicating with a software application executing on the mobile device. The control circuitry can include a processor and a memory containing machine instructions to be executed by the processor. The mobile device accessory can include a wearable component comprising a lanyard having a predetermined length configured to mechanically attach to the first housing, and configured to at least partly remove the removable connector from the first housing when the lanyard is pulled. The software application can include instructions stored in a memory device of the mobile device, that when executed by a data processing apparatus of the mobile device can cause the mobile device to perform operations including sending, in response to the activation, a communication to one or more recipients. The operations can also include sending one or more predetermined messages to one or more predetermined recipients. The predetermined message can include one or more of: a distress message, positioning coordinates, audio captured by mobile device, and video captured by the mobile device. Initiating a communication with another communication device can include initiating one or more of: a telephone call, an email, and a text message. The input mechanism can include a first button, and actuation of the input mechanism can include actuation of the first button. The first housing can defines a first lateral surface arranged substantially perpendicular to the first attachment surface, and the first button can be arranged on the first lateral surface. The first housing can define a second lateral surface arranged substantially perpendicular to the first attachment surface opposite the first lateral surface, and the input mechanism can also include a second button arranged on the second lateral surface opposite the first button. Actuation of the input mechanism can include substantially simultaneous actuation of the first button and the second button. The mobile device accessory can include an adhesive pad configured to adhere the first attachment surface to another surface. The first housing can define a cavity configured to retain one or more credit cards or identification cards. The mobile device accessory can include a second housing comprising a second attachment surface configured to mechanically engage the first attachment surface and a third attachment surface configured to mechanically engage a mobile device, and defining a cavity configured to retain one or more credit cards or identification cards. The removable connector can be configured to be at least partially removed by using a fingernail slot in the removable connector.

In a third embodiment, a mobile device accessory includes (a) a communication mechanism configured to adhere to another surface and maintain a wireless communications connection between the mobile device accessory and a mobile device for controlling operation of the mobile device, (b) a user input mechanism at least partially in the housing and configured to activate in response to input by a user of the mobile device, and (c) a control circuit configured to control operation of the mobile device accessory, the control circuit at least partly disposed within the communication mechanism and configured to perform operations including (i) detect activation of the user input mechanism, and (ii) in response to the activation, (a) cause an audible alarm to be emitted by the mobile device, or (b) cause a software application to be executed on the mobile device, or (c) both.

Various embodiments can include some, all, or none of the following features. The software application, when executed on the mobile device, can cause the mobile device to perform operations including providing a human-perceptible alarm. The communication mechanism can include a button, wherein the connectivity sensor is further configured to be activated in response to actuation of the button. The removable connector can be configured to be at least partially removed by using a fingernail slot in the removable connector.

The systems and techniques described here may provide one or more of the following potential advantages. For example, the mobile device accessory as described herein may provide protection for a user of the accessory who comes under attack or assault by another entity (e.g., another human or an animal) by performing one or more of the following actions upon activation of the accessory: causing the mobile device to perform an operation such as sending a message or call for help, turning on the mobile device's camera, microphone, speaker, light or the like, and/or emitting a human perceptible alarm designed to draw attention to the user and/or scare off the attacker.

Details of one or more implementations are set forth in the accompanying drawings and the description below. Other features and potential advantages will be apparent from the description and drawings, and from the claims.

DETAILED DESCRIPTION

This document describes systems and techniques for providing personal protection in the form of an alarm accessory for a mobile device. In general, a mobile device, e.g., a cellular telephone (phone) or a mobile phone, can be modified (e.g., attached to an accessory and/or through the use of specialized software on the mobile device), to respond to one or more predetermined conditions to automatically, and/or with user interaction, trigger an alarm and thereby draw attention to that person's present circumstances in order to seek help and/or scare away a potential threat. Accordingly, this document describes, among other things, an accessory that can be attached to the mobile device and provide enhanced safety functionality to a user of the mobile device. Various configurations of such a mobile device accessory and its use are described herein, and may include various combinations of the following features and/or functionality. The accessory may be embodied in many different forms and should not be construed as limited to the implementations set forth herein. As used in the specification, and in the appended claims, the singular forms "a", "an", "the", include plural variations unless the context clearly dictates otherwise.

As illustrated in FIGS. 1-6, the present disclosure relates to a mobile phone accessory 100, also referred to a mobile device accessory. The mobile phone accessory 100 may be configured for use with a mobile device such as mobile phone 200 or other mobile device (e.g., tablet computer, notebook computer, etc.). In particular, the mobile phone accessory 100 may be configured to engage (e.g., adhere to or otherwise be physically joined to) the mobile phone 200. The mobile phone accessory 100 may be configured to engage any portion of the mobile phone 200, such as the rear surface of the housing of the mobile phone 200.

Figure 1:
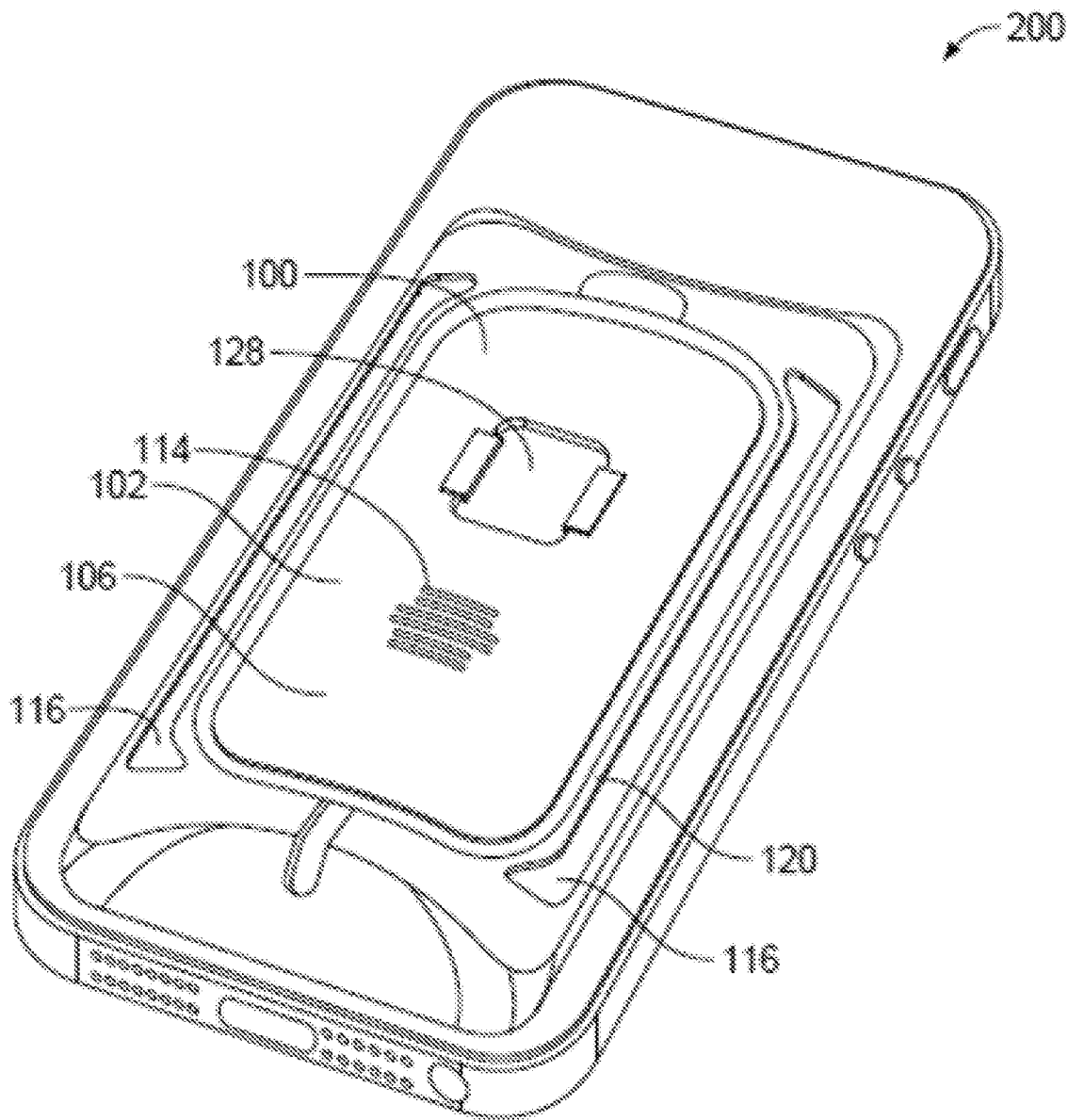
FIG. 1 illustrates a perspective view of a mobile device accessory coupled to a mobile device.
Figure 2:
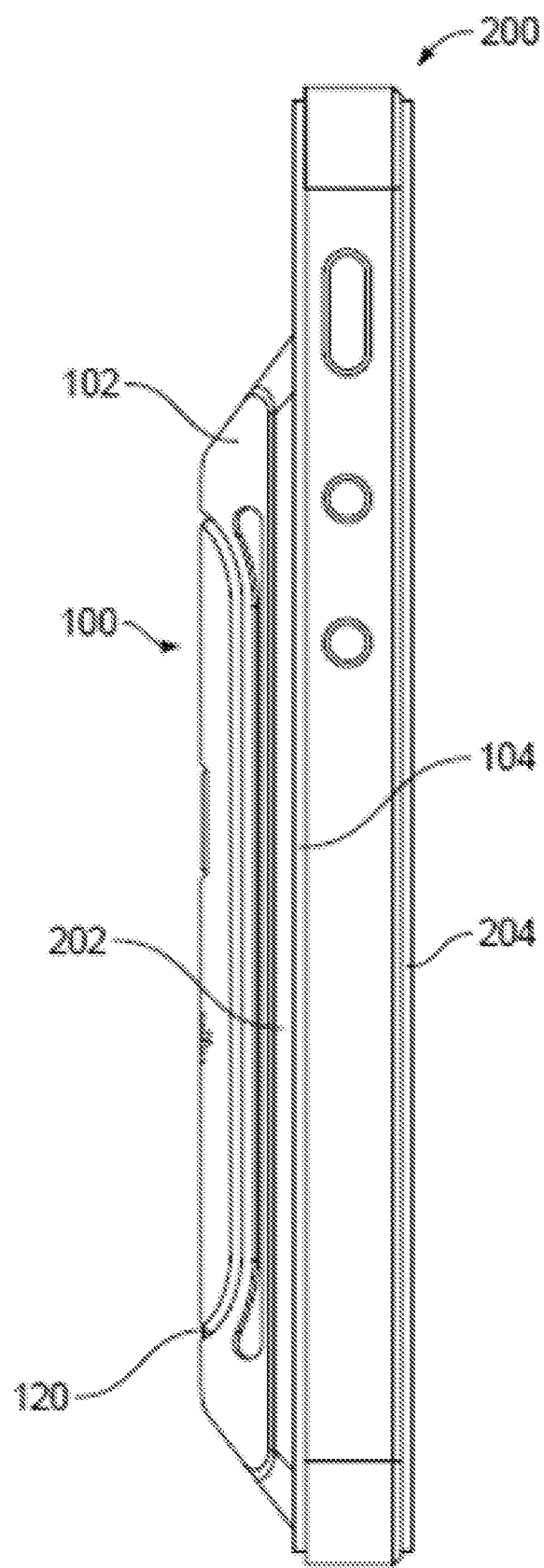
FIG. 2 illustrates a side view of the mobile device accessory and mobile device of FIG. 1.
Figure 3:
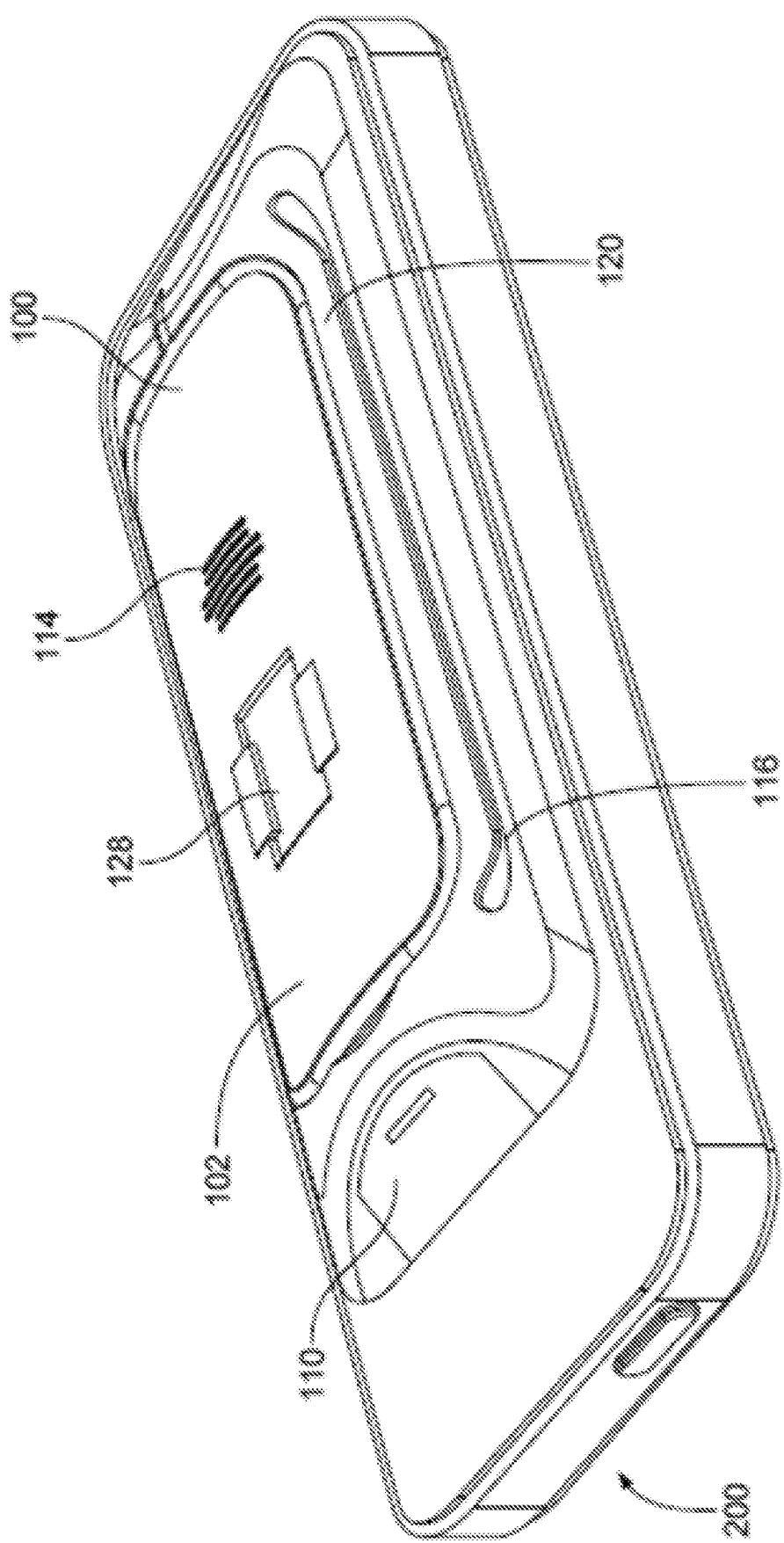
FIG. 3 illustrates an alternate perspective view of the mobile device accessory and mobile device of FIG. 1.

In one implementation, the mobile phone accessory 100 may include a housing 102. The housing 102 may define an attachment (e.g., locking) surface 104 (see, FIG. 2) and an outer surface 106 (see, e.g., FIG. 1). As illustrated in FIG. 2, the attachment surface 104 may be configured to engage a rear surface 202 of the mobile phone 200 opposite from a front surface 204 at which a display is positioned. Thereby, the mobile phone accessory 100 does not block the display in this configuration. Further, the mobile phone accessory 100 may occupy less than an entirety of an area of the rear surface 202 of the mobile phone 200. Thereby, the mobile phone accessory 100 may not block any rear-facing camera thereon. Further, by providing the mobile phone accessory 100 with a relatively small size, the mobile phone accessory may be attached to mobile phones with differing sizes and shapes. Further, the mobile phone accessory 100 may be configured to not extend to the edges of the mobile phone 200, such that an edge protecting case may be employed with the mobile phone. As may be understood, the mobile phone accessory may also be configured to engage a case for the mobile phone that includes a rear portion that covers the rear surface (see, e.g., FIGS. 21 and 22). In another embodiment, the mobile phone accessory may itself comprise a case for the mobile phone (see, e.g., FIG. 11).

The attachment surface 104 of the housing 102 may be configured to substantially permanently engage the rear surface 202 of the mobile phone 200, or a case positioned at the rear surface as noted above. For example, the mobile phone accessory 100 may include an adhesive at the attachment surface 104 configured to adhere to the rear surface 202 of the mobile phone 200. Thereby, the mobile phone accessory 100 may be configured for use over the lifetime of the mobile phone 200, thereby ensuring that the mobile phone accessory is available at all times the mobile phone is in the user's possession. Alternatively, the attachment surface 104 of the housing 102 may be configured to releasably engage (e.g., using a slot-tab arrangement, or hook and loop connecting surfaces such as VELCRO®) the rear surface 202 of the mobile phone 200, or a case positioned at the rear surface as noted above.

Figure 4:
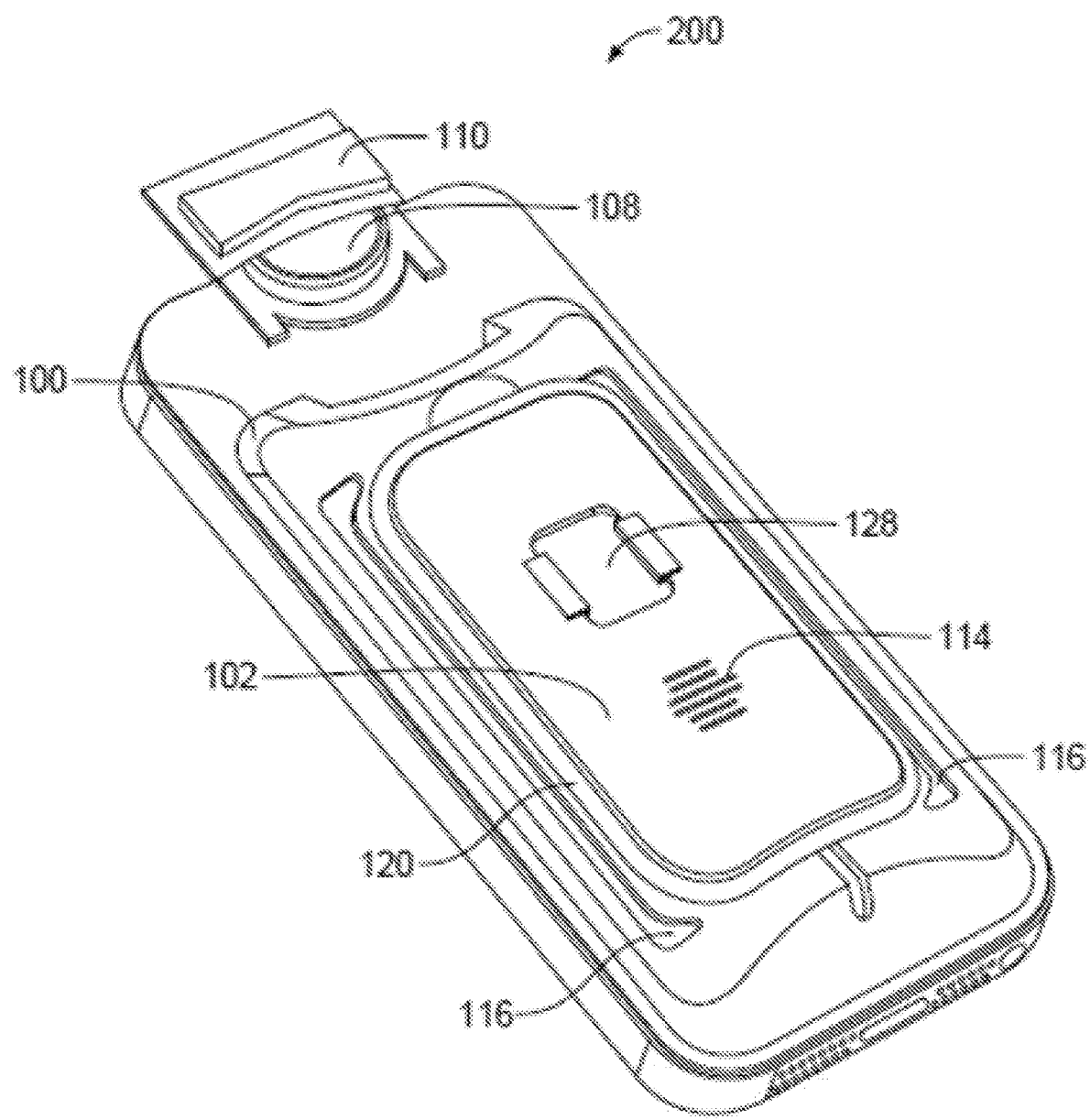
FIG. 4 illustrates an alternate perspective view of the mobile device accessory and mobile device of FIG. 1 wherein a power source of the mobile device accessory is removed.

As illustrated in FIG. 4, the mobile phone accessory 100 may include a power source 108, which may be a battery. Further, the housing 102 may include a battery portion 110 that is configured to receive the power source 108. The battery portion 110 may be removable to allow for replacement of the power source 108. The power source 108 may be configured to provide electrical power to each of the components of the mobile phone accessory 100 such that the mobile phone accessory is self-powered. However, as may be understood, in another implementation the mobile phone accessory may be configured to receive electrical power from the mobile phone. For example, the mobile phone accessory may include a connector that engages a power port or a headphone jack on the mobile phone. Alternatively, or in addition, the mobile phone accessory may draw power from the phone wirelessly via a technique akin to QI® inductive charging, but in reverse.

Figure 6:
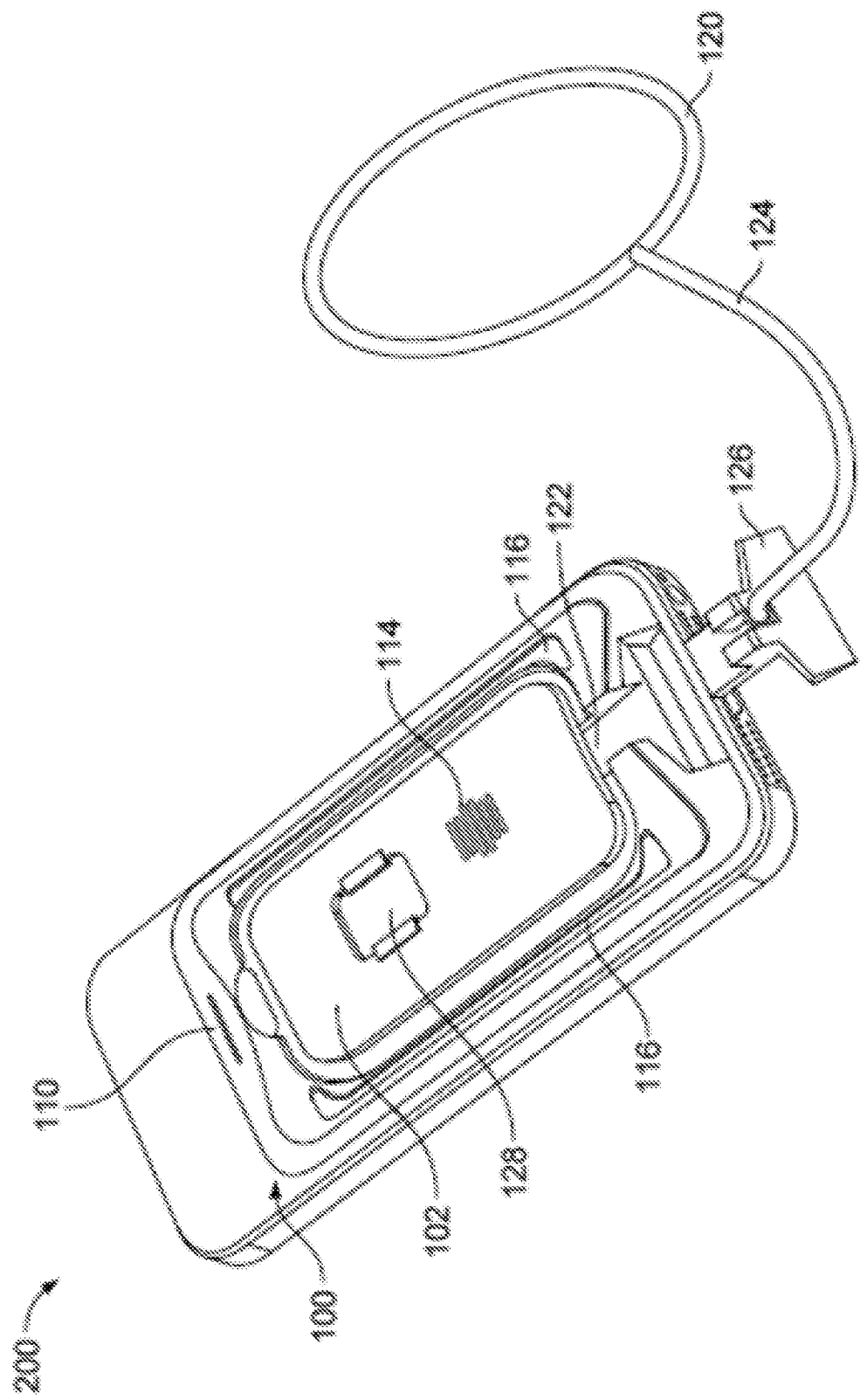
FIG. 6 illustrates an alternate perspective view of the mobile device accessory and mobile device of FIG. 1 wherein a user separation sensor arrangement activates an alarm device.
Figure 7:
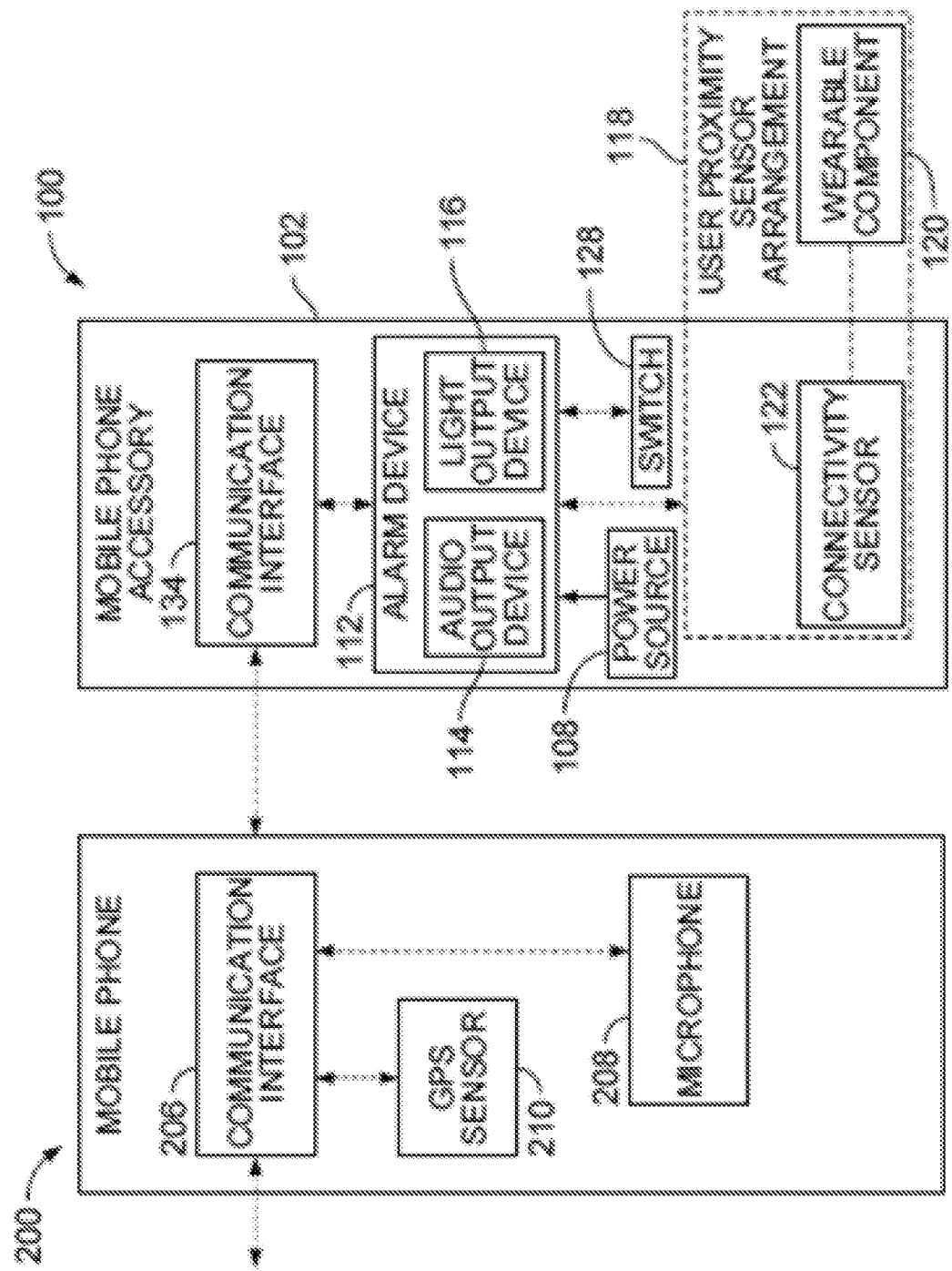
FIG. 7 schematically illustrates components of the mobile device and the mobile device accessory of FIG. 1.

Additional control circuitry components of the mobile phone accessory 100 and the mobile phone 200 are schematically illustrated in FIG. 7. As illustrated, the mobile phone accessory 100 includes an alarm device 112, which may be at least partially received in the housing 102. The alarm device 112 is in communication with the mobile phone 200 (e.g., BLUETOOTH, USB) for providing signals to the mobile phone 200, for example, to request, trigger, command, or otherwise control at least some operation or actions of the mobile phone 200. The alarm device 112 may include an audio output device 114 such as a speaker and a light output device 116 such as a light emitting diode (LED) or xenon strobe. Example positions and configurations of the audio output device 114 and the light output device 116 are illustrated in FIGS. 1 and 3-6.

As further illustrated in FIG. 7, the control circuitry of the mobile phone accessory 100 includes a user separation sensor arrangement 118 (e.g., proximity detector). The user separation sensor arrangement 118 may include a wearable component 120 configured to engage (e.g., donned by, worn by) a user and a connectivity sensor 122 engaged with the housing 102 and in communication with the alarm device 112. The alarm device 112 may be configured to activate and/or perform one or more predetermined operations in response to the connectivity sensor 122's determining that the wearable component 120 exceeds a threshold separation distance therefrom, and/or has become detached (e.g., mechanically separated) from the mobile accessory 100, e.g., providing an alarm signal to indicate that separation between the mobile accessory 100 and the wearable component 120 has occurred, in response to which one or more actions can occur—e.g., sounding an audible alarm on the accessory, emitting light from a light source on the accessory, cause the attached phone's flash light to turn on or strobe, cause the attached phone to transmit a message via text and/or phone call, cause the mobile phone to emit sound, cause the mobile phone to take photos or begin recording video, either through the forward-facing camera or the rearward-facing camera or the both, or otherwise any operation within the attached phone's functionalities. Note that any phone-based action could be achieved by the accessory's transmitting to the mobile phone that an alarm condition has been detected, e.g., in response to the user's pushing a button on the accessory, or in response to the proximity between the accessory and the wearable component being exceeded and/or in response to the wearable component being mechanically disconnected from the accessory.

Figure 5:
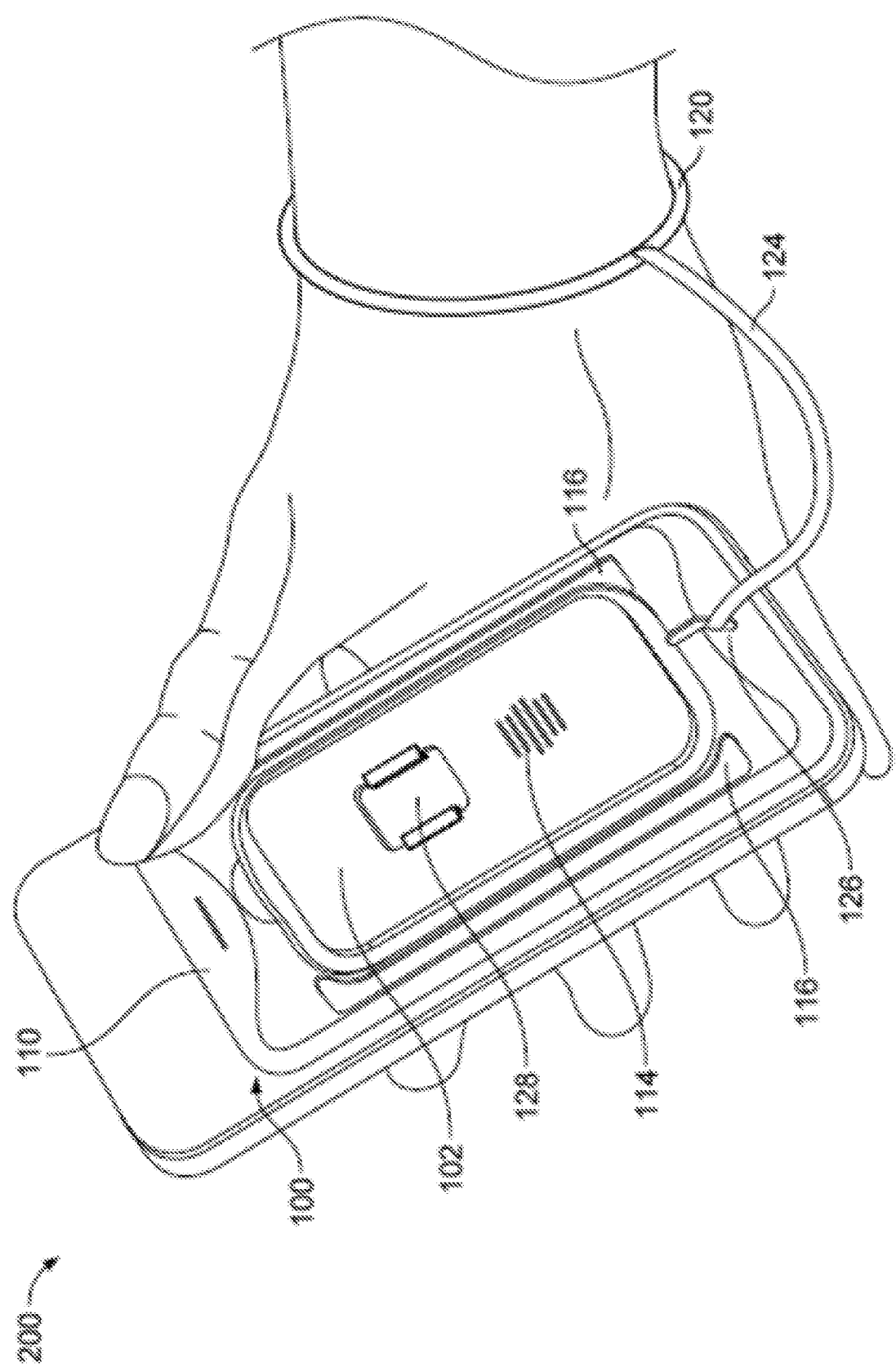
FIG. 5 illustrates an alternate perspective view of the mobile device accessory and mobile device of FIG. 1 wherein a wrist strap of the mobile device accessory is in use.

With regard to the latter, as illustrated in FIG. 5, in one embodiment the wearable component 120 may comprise a wrist strap. Initially, the connectivity sensor 122 and the wearable component 120 of the user separation sensor arrangement 118 may be physically connected. For example, as illustrated in FIG. 5, a lanyard 124 (e.g., mechanical tether) may connect the wearable component 120 to the housing 102 via a connector 126.

As noted above, the alarm device 112 may be activated in response to receipt of a signal generated by the separation sensor arrangement 118 when the user separation sensor arrangement 118 determines that the wearable component 120 has become physically detached from the accessory, and/or exceeds a threshold separation distance from the connectivity sensor 122. Thereby, the threshold separation distance may be defined between the housing 102 and the wearable component 120. Thus, for example, the lanyard 124 may have a predetermined length that at least partially defines the threshold distance, and the lanyard may be configured to mechanically and/or electrically attach to the housing 102 and separate from the housing 102 when the distance between the wearable component 120 and the housing 102 exceeds the predetermined length of the lanyard 124. The separation sensor arrangement 118 can include a connectivity sensor configured to determine whether the housing 102 and the lanyard are mechanically and/or electrically separated and provide an alarm signal in response.

As illustrated in FIG. 6, when a user's wrist to which the wearable component 120 is attached moves away from the housing 102 of the mobile accessory device 100 by a distance exceeding the length of the lanyard 124, the lanyard may pull out (e.g., separate, break away) the connector 126 from the housing 102 and out of engagement with the connectivity sensor 122, thereby activating the alarm device 112 (see, FIG. 7).

Further, in one embodiment the connector 126 may include a whistle. Thereby, once the connector 126 is removed from the housing 102, the user may blow on the whistle to bring attention to the user's circumstances, scare away an assailant, and/or summon help.

In an alternate embodiment, the connector extending from the wearable component may be configured to engage a power and/or data port of the mobile phone or a headphone jack thereon. In this embodiment, the mobile phone may itself (e.g., via a software application executing on the mobile phone) detect detachment or separation of the wearable component from the port or jack, thereby activating the alarm device.

As schematically illustrated in FIG. 7, the mobile phone accessory 100 may also include a switch 128. The switch 128 may be provided in addition to, or as an alternate for, the user separation sensor arrangement 118. In a preferred embodiment, both the user separation sensor arrangement 118 and the switch 128 are provided.

Figure 8:
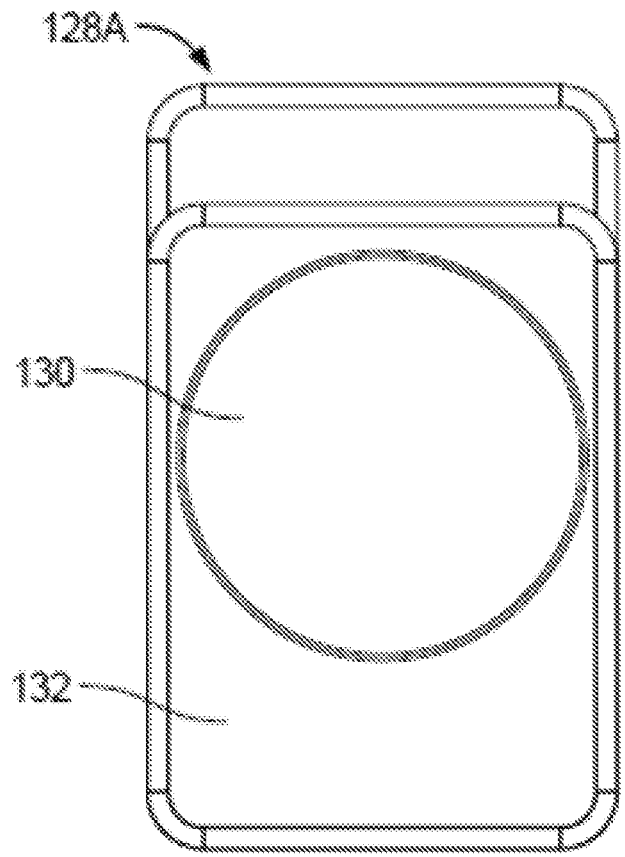
FIG. 8 illustrates an enlarged view of the switch of the mobile device accessory of FIG. 1.

An example embodiment of the switch 128 is illustrated in FIGS. 1 and 3-6. In some embodiments it may be desirable to provide the switch 128 with features configured to prevent accidental actuation thereof so as to avoid accidental activation of the alarm device 112 (see, FIG. 7). In this regard, in some embodiments actuation of the switch 128 may require movement of the switch along a non-linear path. For example, FIG. 8 illustrates an enlarged example embodiment of an embodiment of the switch 128A. As illustrated, the switch 128A may include a center button 130 and an outer slider 132. In order to activate the switch 128A, a user may slide the slider 132 in order to depress the center button 130. Thereby, issues with respect to accident actuation of the switch 128A may be mitigated. Various other switches requiring multi-stage actuation may be provided in other embodiments.

The alarm device 112 may be configured to be activated in response to a signal from the user separation sensor arrangement 118 and/or the switch 128. The particular response by the alarm device 112 may be set as desired. In some embodiments activation of the alarm device 112 by the switch 128 may result in the same response as activation of the alarm device by the user separation sensor arrangement 118. However, in other embodiments activation of the alarm device 112 by the switch 128 may result in a different response as compared to activation of the alarm device by the separation sensor 118.

For example, the alarm device 112 may be configured to output an audible alarm configured to output sounds, predetermined spoken words, and/or noises (e.g., siren, buzzer, bell, speech) that are loud enough to attract attention from others in the vicinity of the mobile phone 200 when the user separation sensor arrangement 118 determines that the threshold separation distance is exceeded. In this regard, one or both of the audio output device 114 and the light output device 116 may be activated. However, in some configurations, the alarm device 112 may be silently activated when the switch 128 is actuated (e.g., the alarm device 112 or the mobile phone 200 may be configured to omit the emission of an attention-getting sound during activation). In some embodiments, a silent alarm can refer to any appropriate circuit and/or mechanism for taking a predetermined action in response to a trigger, and does not necessarily require (nor preclude) that the alarm device is itself incapable of generating an audible alarm.

In this regard, the alarm device 112 may be configured to direct the mobile phone 200 to send a communication (e.g., a telephone call, an SMS text message, an instant message, and email) to one or more predefined recipients in response to actuation of the switch 128. In some implementations, the communication can include one or more predetermined messages (e.g., pre-recorded voice message, pre-configured text or synthesized voice message). In some implementations, the communication can be sent to one or more predetermined recipients (e.g., emergency response center, 911, police, user contacts). The alarm device 112 may be configured to direct the mobile phone 200 to send a communication to one or more predefined recipients when the user separation sensor arrangement 118 determines that the threshold separation distance from the wearable component 120 is exceeded, and/or that the wearable component 120 has become detached from the accessory 100.

The alarm device 112 may be configured to direct the mobile phone 200 to activate a camera (e.g., to capture still or motion video of the surroundings), microphone (e.g., to capture sounds in the surrounding environment), position location detector system (e.g., GPS or other location system to identify a local or global location of the phone), light output system to emit a visual indicator (e.g., blink an onboard LED, flash the phone's screen), and/or audio output system (e.g., built-in speaker of the phone, to emit an audible alarm or call for help) of the mobile phone 200, In some implementations, the communication can include one or more of a distress message, positioning coordinates (e.g., based on a GPS sensor in the mobile device), audio captured by mobile device, and video captured by the mobile device. The functionality of being able to send a communication in response to an alarm or other predetermined condition may be implemented by specialized software installed on and executed by the mobile device, for example, a downloadable software application (e.g., app) or other software component.

To transmit such notifications, as schematically illustrated in FIG. 7, the mobile phone accessory 100 may further comprise a communication interface 134. The communication interface 134 may be configured to communicate with a communication interface 206 of the mobile phone 200 when directed by the alarm device 112. The communication interface 134 of the mobile phone accessory 100 and the communication interface 206 of the mobile phone 200 may be any suitable arrangement, such as a device or circuitry embodied in either hardware, software, or a combination thereof that is configured to receive and/or transmit data. The communication interfaces 134, 206 may be configured to receive and/or transmit data via a wired or wireless connection. In this regard, the communication interfaces 134, 206 may include, for example, an antenna and supporting wireless transmitter, receiver, or transceiver hardware and/or hardwired components and/or software. For example, the communication interface 134 of the mobile phone accessory 100 may include a wireless transmitter, receiver, or transceiver configured to communicate with the communication interface 206 of the mobile phone 200 via BLUETOOTH, photonic (e.g., infrared, IRDA), acoustic, ultrasonic, ZigBee, WiFi, or any other appropriate communication format. Further, the communication interface 206 of the mobile phone 200 may be configured to communicate with one or more cellular networks via any known communication standard.

Thereby, the communication interface 206 of the mobile phone 200 may send a communication to one or more designated contacts. The designated contacts may be selected by the user via a user-installable software application that may be loaded on the mobile phone 200. The type and/or content of the message may also be configured within the application.

In some embodiments, the communication may include a phone call with an audible message. For example, a prerecorded message may be played to convey a request for help. Alternatively or additionally, the mobile phone 200 may activate a microphone 208 thereof such that a recipient of the call may receive audio relating to the user of mobile phone accessory's circumstances (e.g., voice or other sounds corresponding to words or actions of the mobile phone user or anyone or anything else within the range of the mobile phone's microphone 208).

In some embodiments, the communication may include a text message, an email, or any other electronic communication. Thereby, the communication may include, for example, a message conveying a request for help and/or instructing the recipient to call police or other emergency services. The communication may also include location data regarding a position of the mobile phone 200. For example, the mobile phone 200 may further include a positioning system sensor 210 (e.g., GPS, GLONASS, indoor positioning), which may determine a location thereof, and such location information may be included in the communication transmitted by the communication interface 206 of the mobile phone. For example, the recipients of the communication may be provided with an image showing the position of the mobile phone 200 and/or a link to a map showing the position. Such a map may be updated with the position of the mobile phone 200 such that the position thereof may be tracked in the event that movement occurs. Thereby, emergency service personnel may be directed to the location of the mobile phone 200.

In another embodiment, communications may additionally or alternatively be transmitted to other users of mobile accessory devices in local proximity to the mobile phone accessory 100. For example, the communication interface 134 of the mobile phone accessory 100 may directly communicate with the communication interface of other nearby mobile phone accessories to alert their users of a nearby user in need of assistance. In some embodiments the mobile phone accessories 100 may form a mesh network via the communication interfaces 134 to expand the reach of the local alerts.

Figure 9:
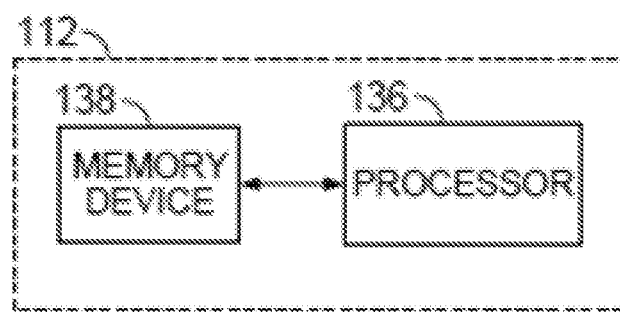
FIG. 9 schematically illustrates components of the alarm device of FIG. 7.

FIG. 9 schematically illustrates control circuitry components of the alarm device 112 according to an embodiment of the present disclosure. As illustrated, the control circuitry of the alarm device 112 may include or otherwise be in communication with a processor 136 and a memory device 138.

The processor 138 may be embodied in a number of different forms. For example, the processor 136 may be embodied as one or more of various processing means such as a coprocessor, a microprocessor, a controller, a digital signal processor (DSP), processing circuitry, or various other processing devices including integrated circuits such as, for example, a special-purpose computer chip, or other hardware processor. In an example embodiment, the processor 136 may be configured to execute instructions stored in the memory device 138 or otherwise accessible to the processor. Alternatively or additionally, the processor 136 may be configured to execute hard coded functionality. As such, the processor 136 may be capable of performing operations according to embodiments of the present disclosure while configured accordingly. Alternatively, when the processor 136 is embodied as an executor of software instructions, the instructions may specifically configure the processor to perform the operations described herein. The processor 136 may include a clock, an arithmetic logic unit (ALU) and logic gates configured to support operation of the processor, amongst other components.

The memory device 138 may include non-transitory and tangible memory that may be, for example, volatile and/or non-volatile memory. The memory device 138 may be configured to store information, data, files, applications, instructions or the like. For example, the memory device 138 can be configured to buffer input data for processing by the processor 136. Additionally or alternatively, the memory device 138 can be configured to store instructions for execution by the processor 136.

The processor 136 may be configured to execute program code instructions stored on a non-transitory computer readable medium. In this regard, an embodiment of a non-transitory computer readable medium for storing computer instructions executed by a processor (e.g., processor 136) is provided, such as the memory device 138. The non-transitory computer readable medium may comprise program code instructions for performing the alarm operations described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling the above-described operations. In particular, computer readable code may be configured to perform each of the operations of the methods described herein and embodied as computer readable code on a computer readable medium for controlling the above-described operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Figure 23:
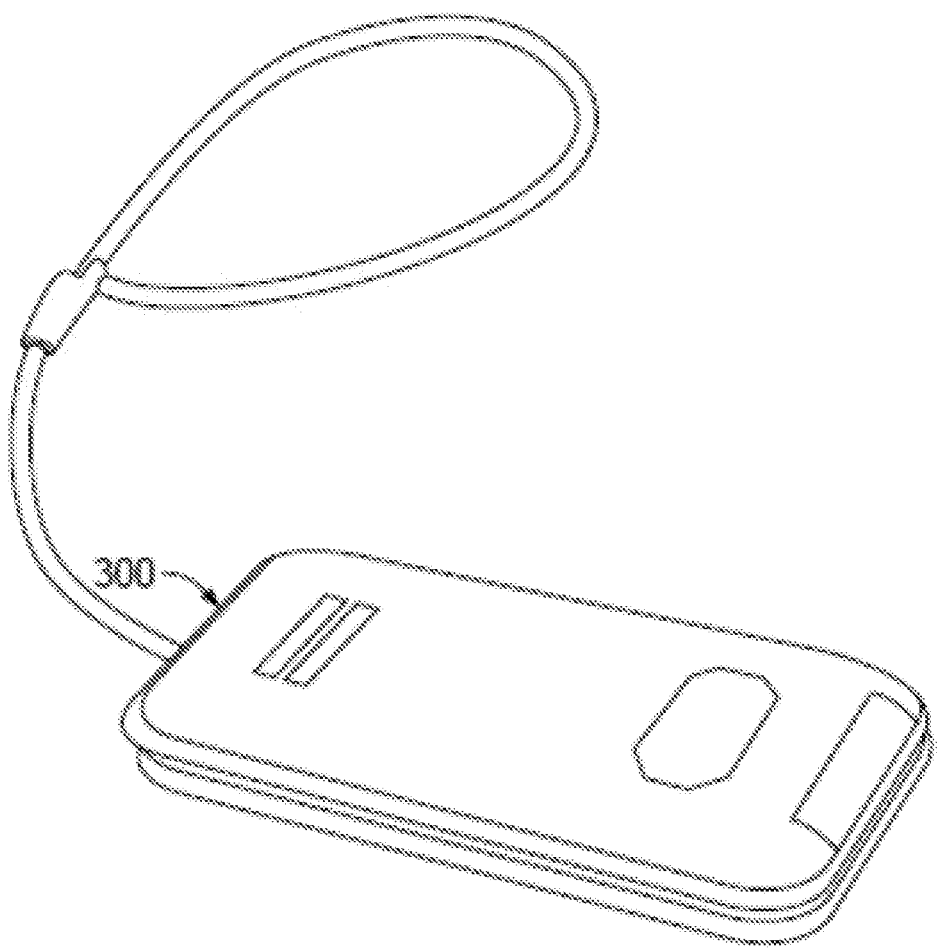
FIG. 23 illustrates a personal safety device that does not require usage of a separate mobile device.

Although the present disclosure is generally described as relating to a mobile phone accessory, in another embodiment some or all of the components of the mobile phone accessory described above may be included in a standalone personal safety device (see, e.g., FIG. 23). In other words, a personal safety device may be configured for use without requiring a separate mobile phone. In this regard, the personal safety device may be configured to communicate with cellular networks and configured to determine a location of the personal safety device. Thus, for example, the communication interface may be configured to communicate with cellular or satellite networks in order to allow for transmission of electronic communications and the personal safety device may further include a GPS sensor configured to determine the location of the personal safety device.

Figure 10:
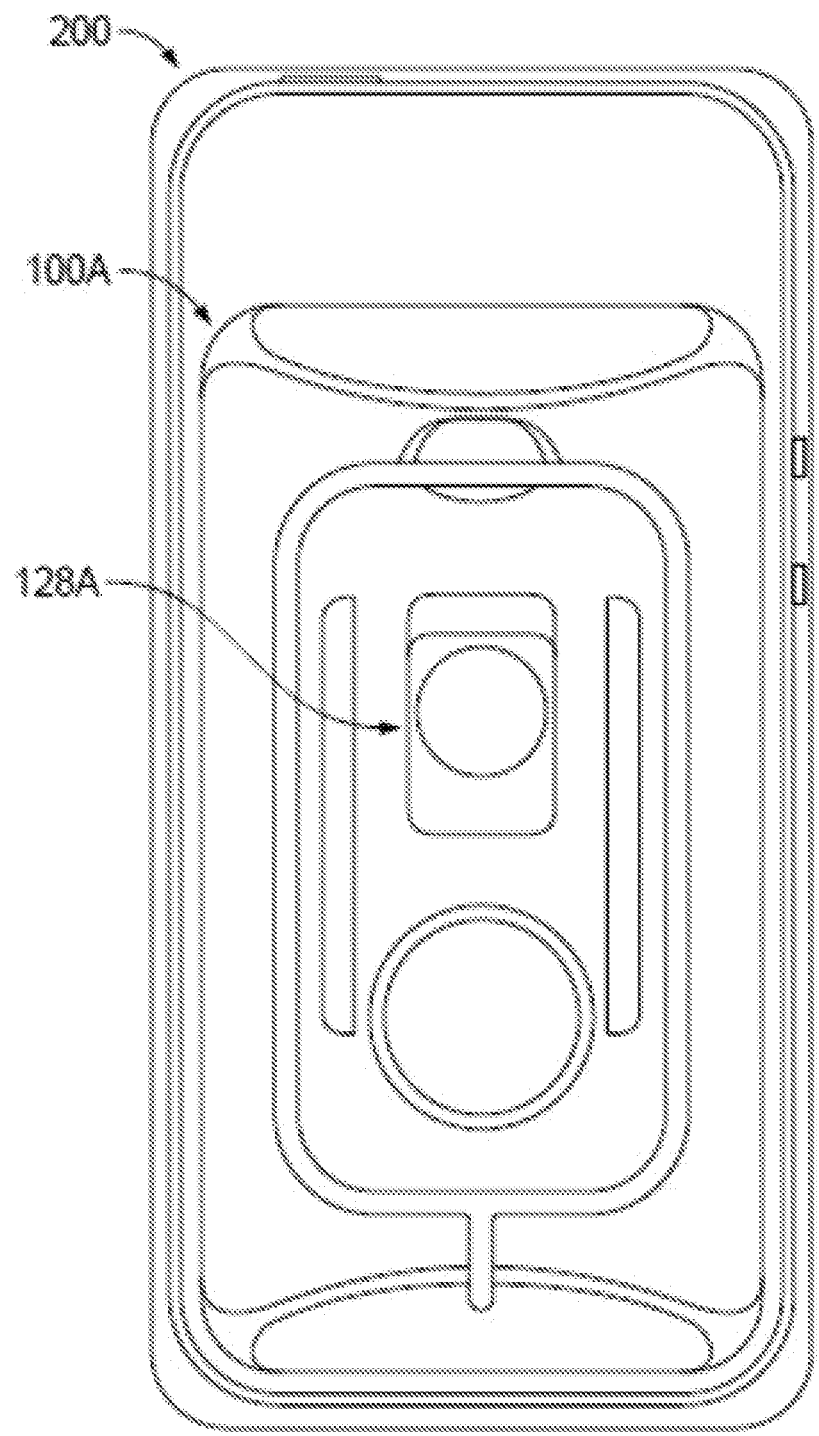
FIG. 10 illustrates an embodiment of the mobile device accessory including the switch of FIG. 8.
Figure 11:
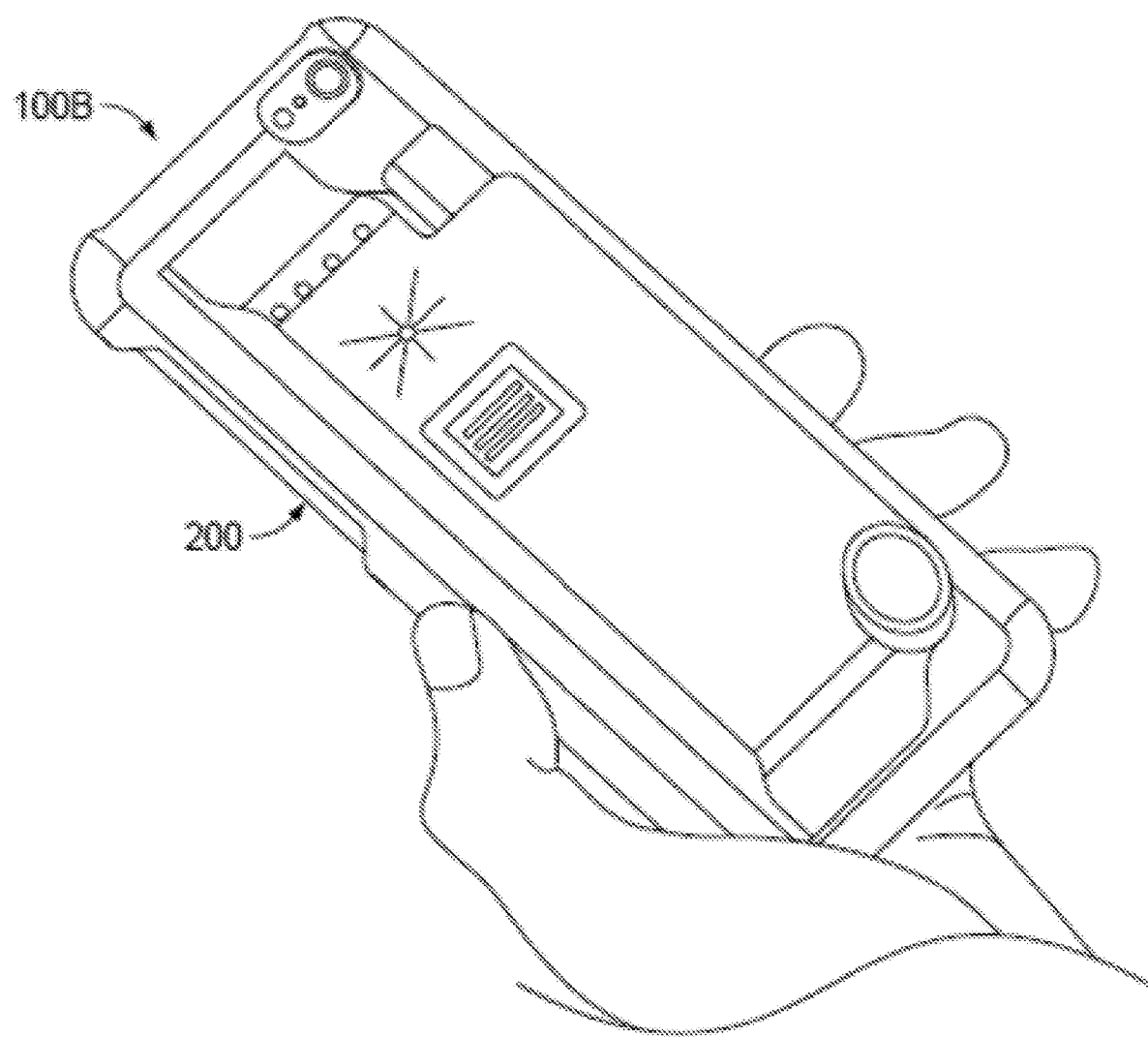
FIG. 11 illustrates a mobile device accessory provided in the form of a case.
Figure 12:
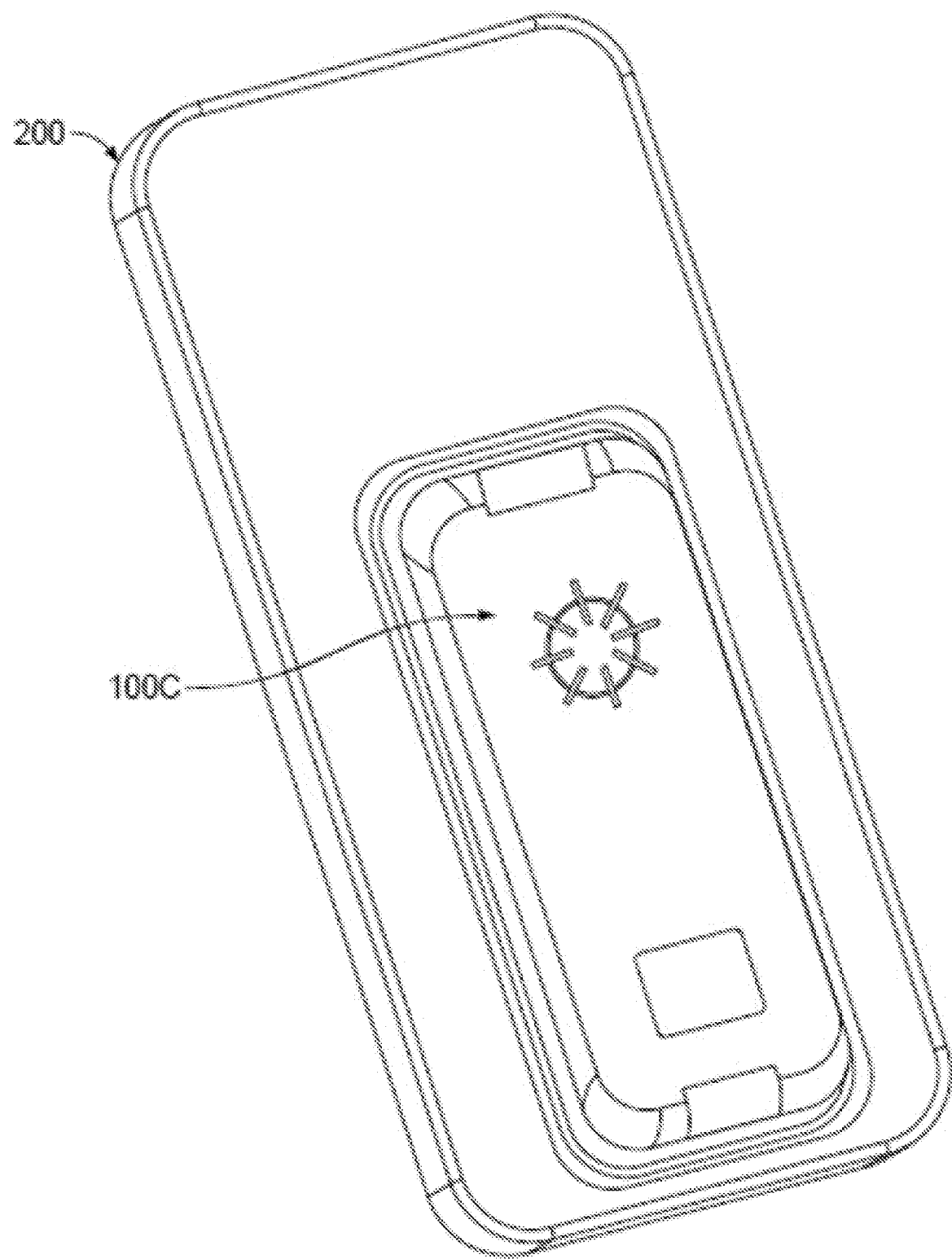
FIG. 12 illustrates a mobile device accessory wherein the mobile device accessory is substantially rectangular with rounded corners.
Figure 13:
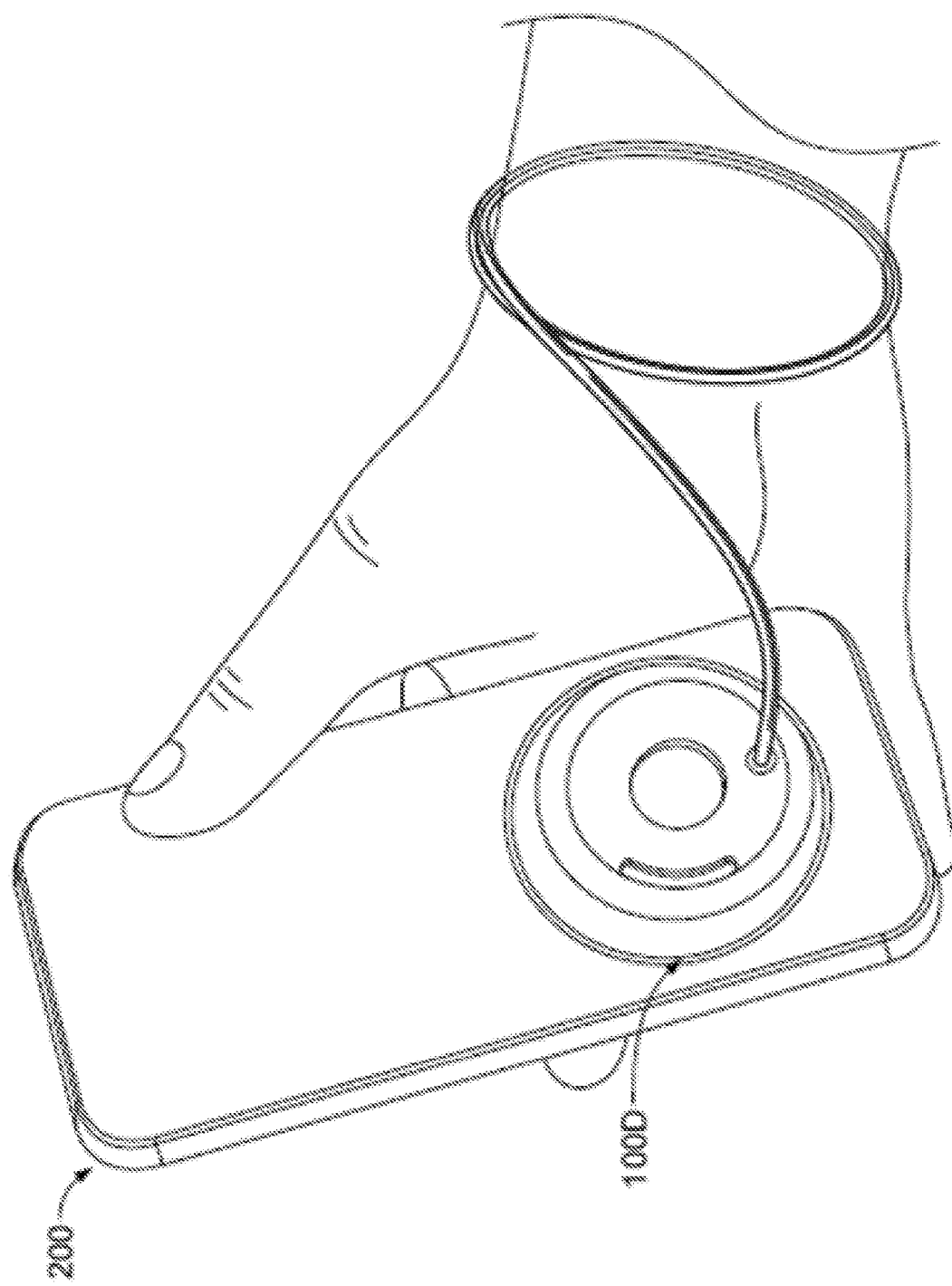
FIG. 13 illustrates a mobile device accessory wherein the mobile device accessory is round.
Figure 14:
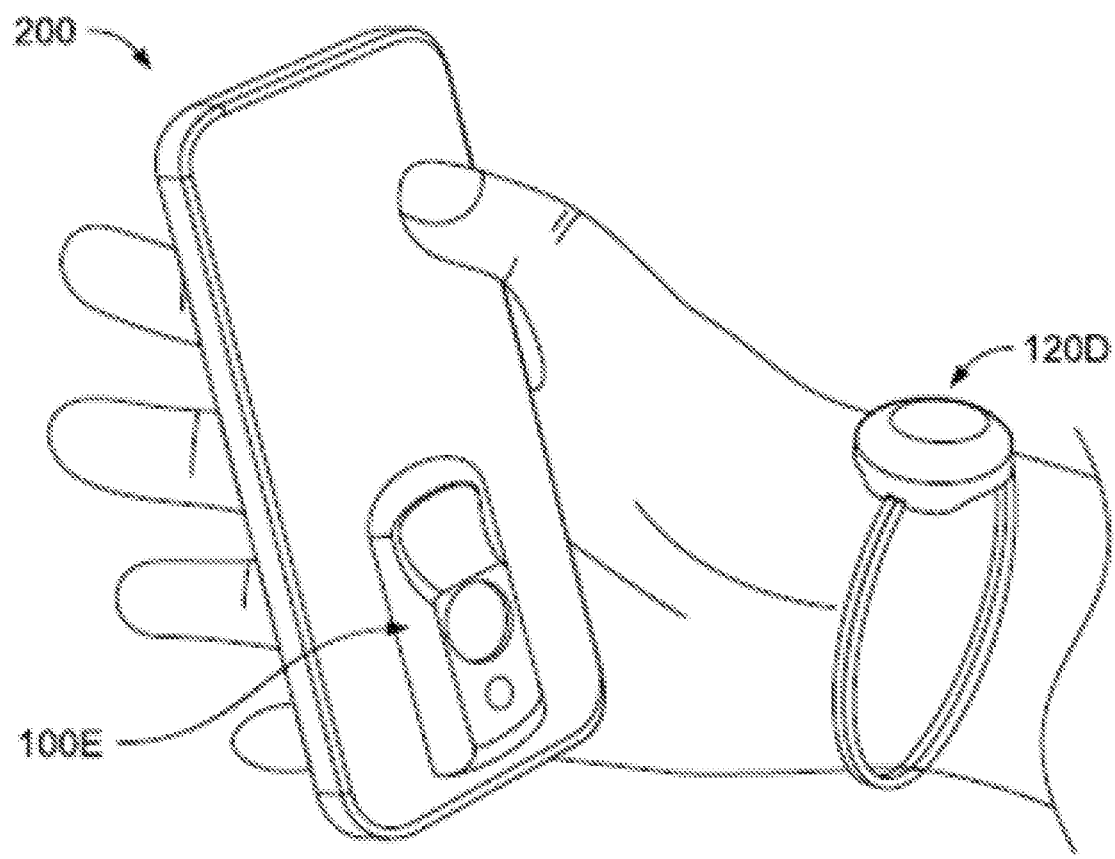
FIG. 14 illustrates a mobile device accessory wherein the user separation sensor arrangement includes a wireless wearable component.
Figure 15:
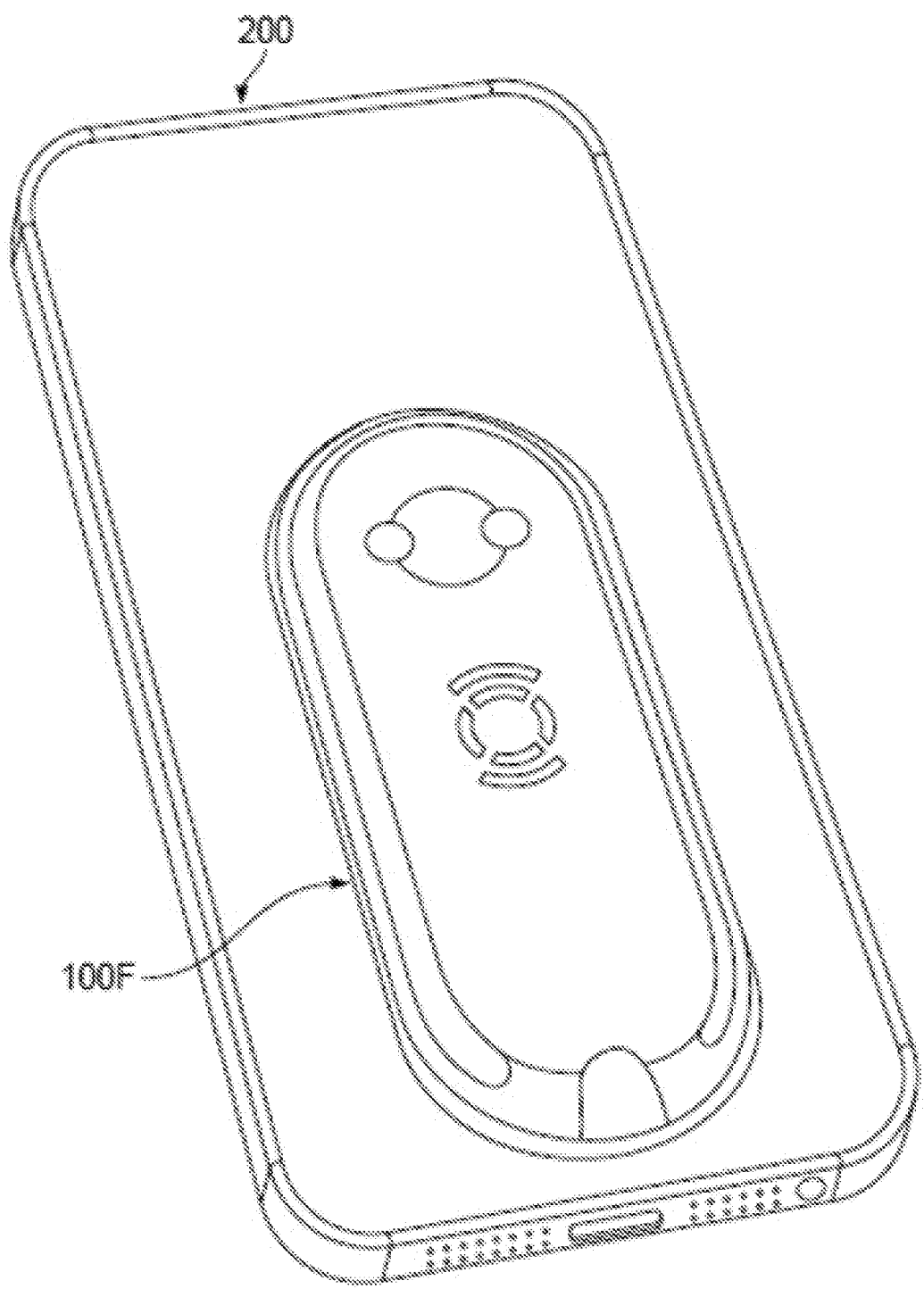
FIGS. 15-18 illustrate a mobile device accessory wherein the mobile device accessory is ovular.
Figure 16:
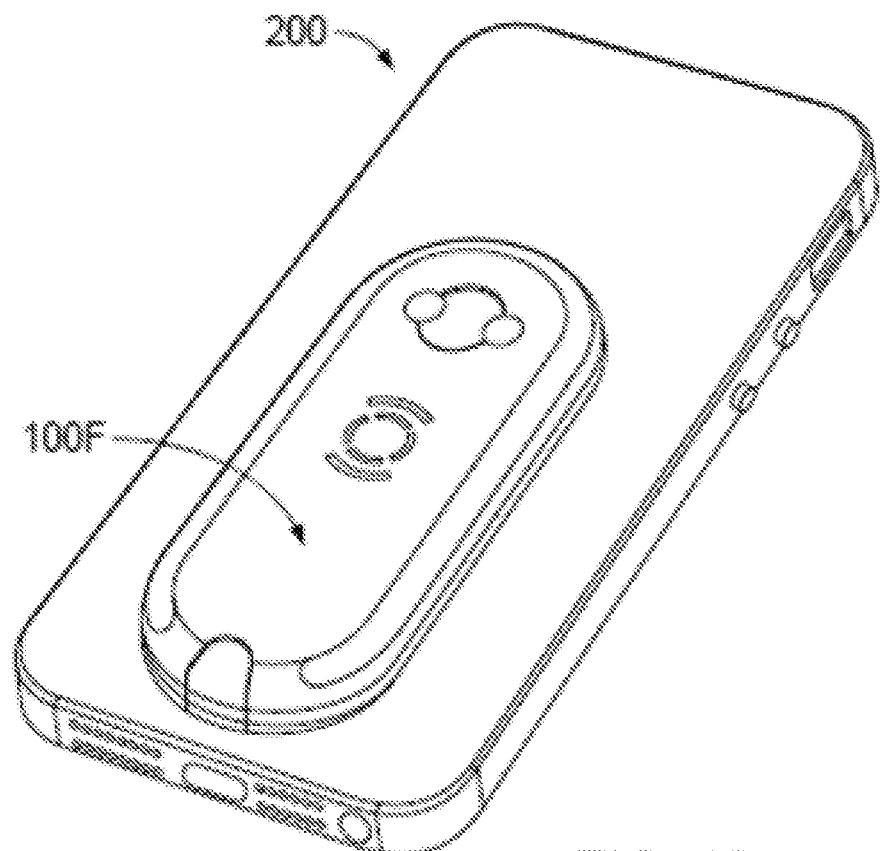
Figure 17:
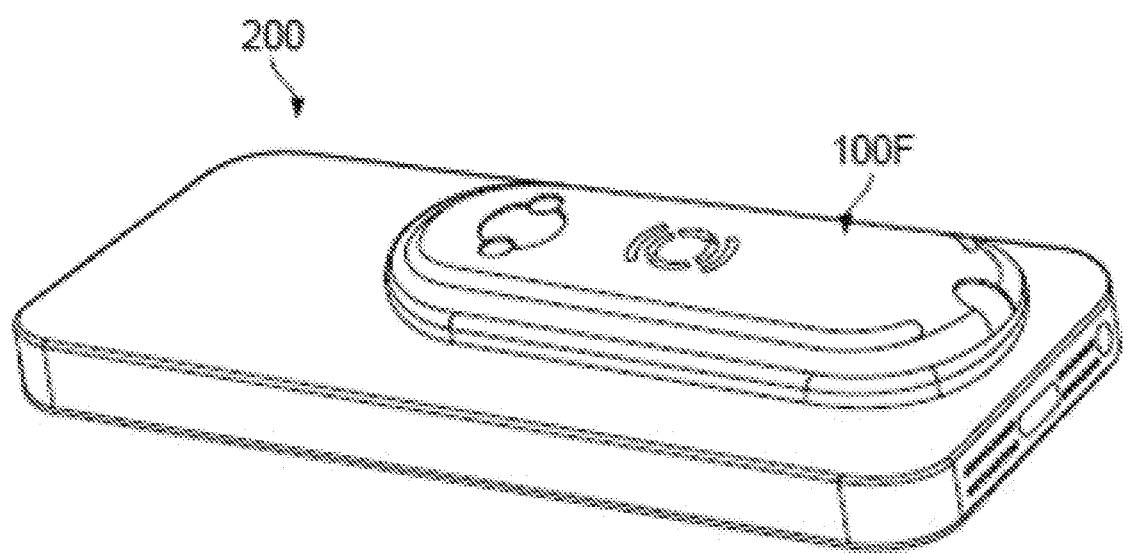
Figure 18:
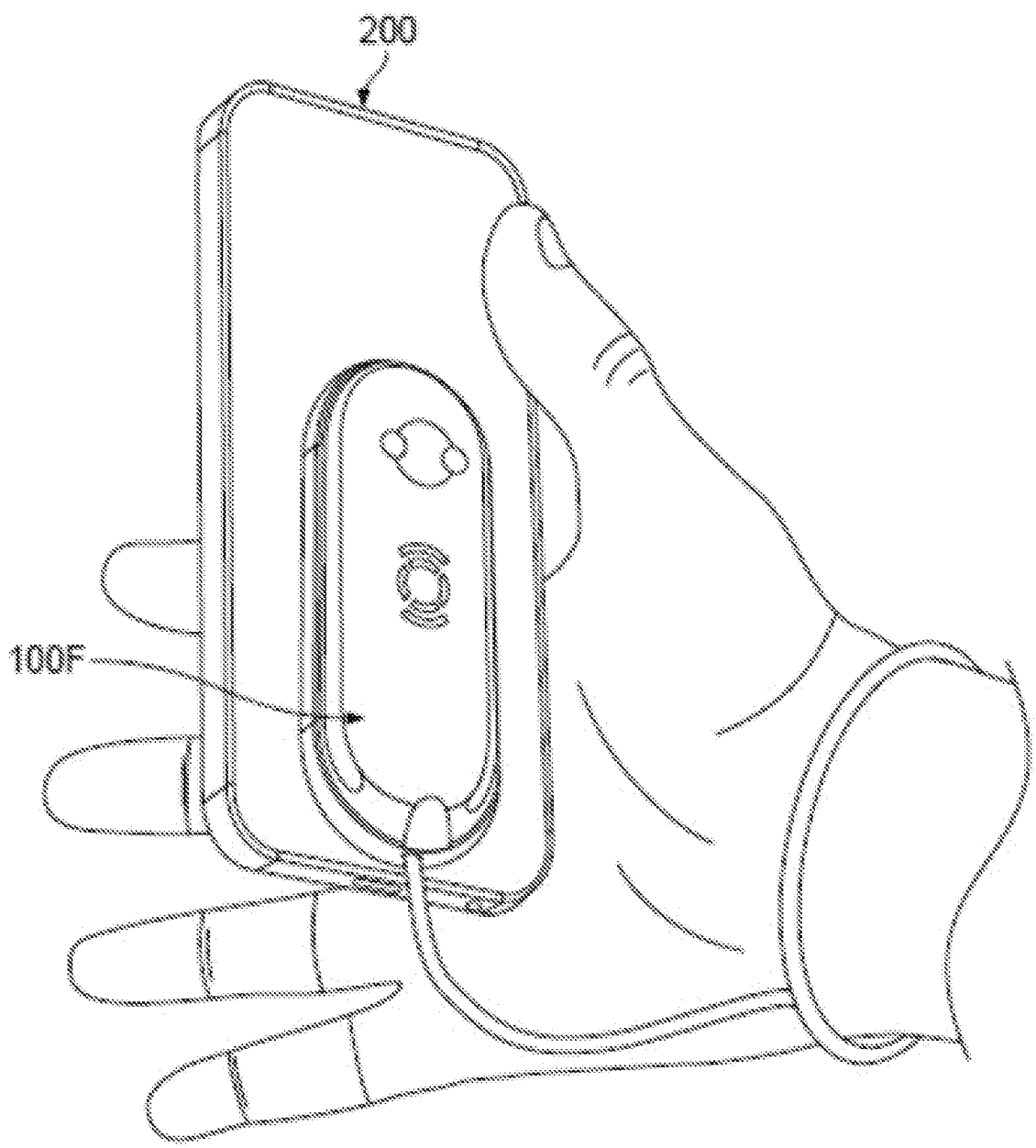
Figure 19:
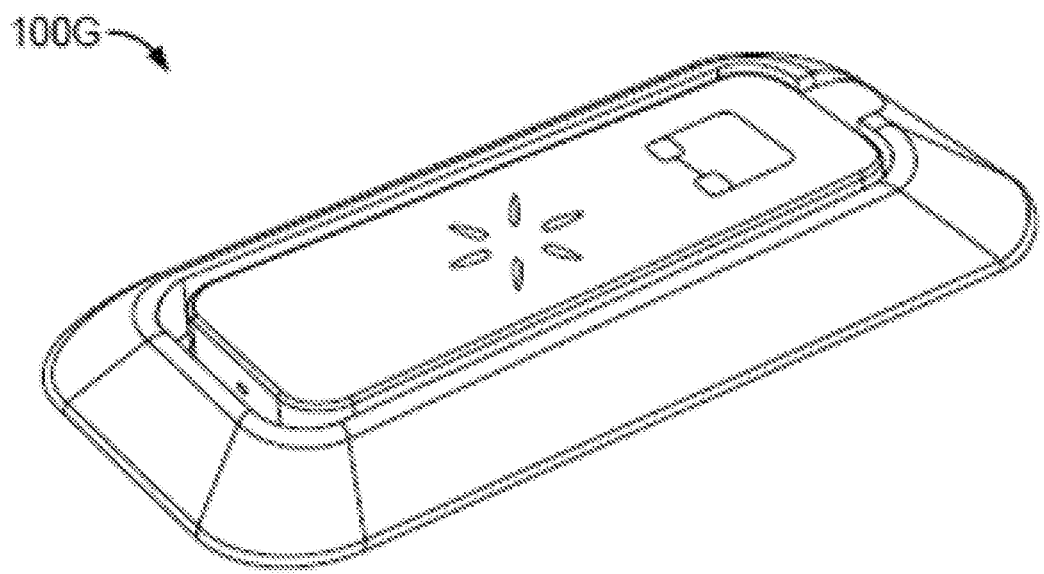
FIG. 19 illustrates a mobile device accessory wherein a wearable component of the user separation sensor arrangement is not attached for illustration purposes.
Figure 20:
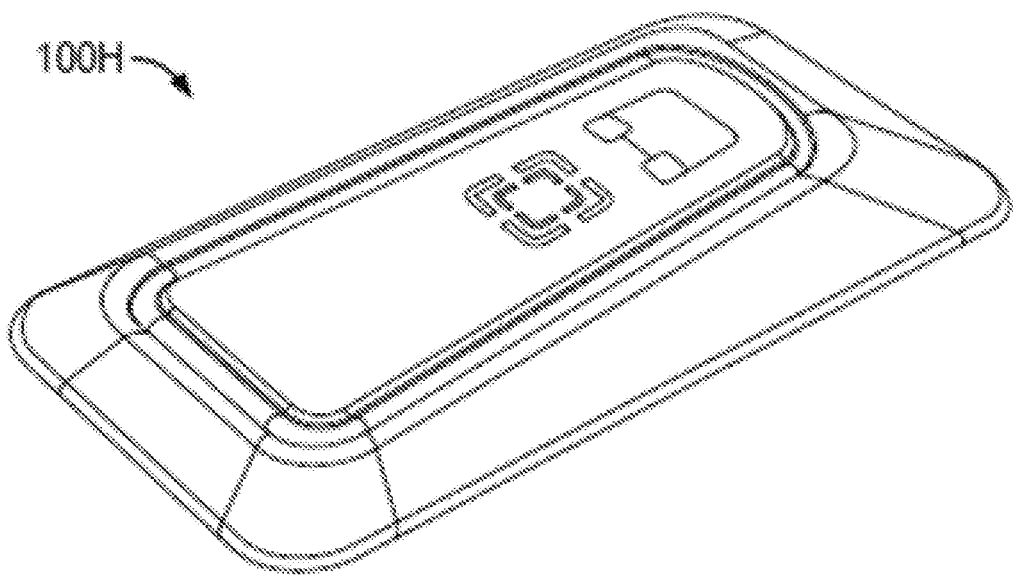
FIG. 20 illustrates a mobile device accessory wherein a mobile device is not attached for illustration purposes.
Figure 21:
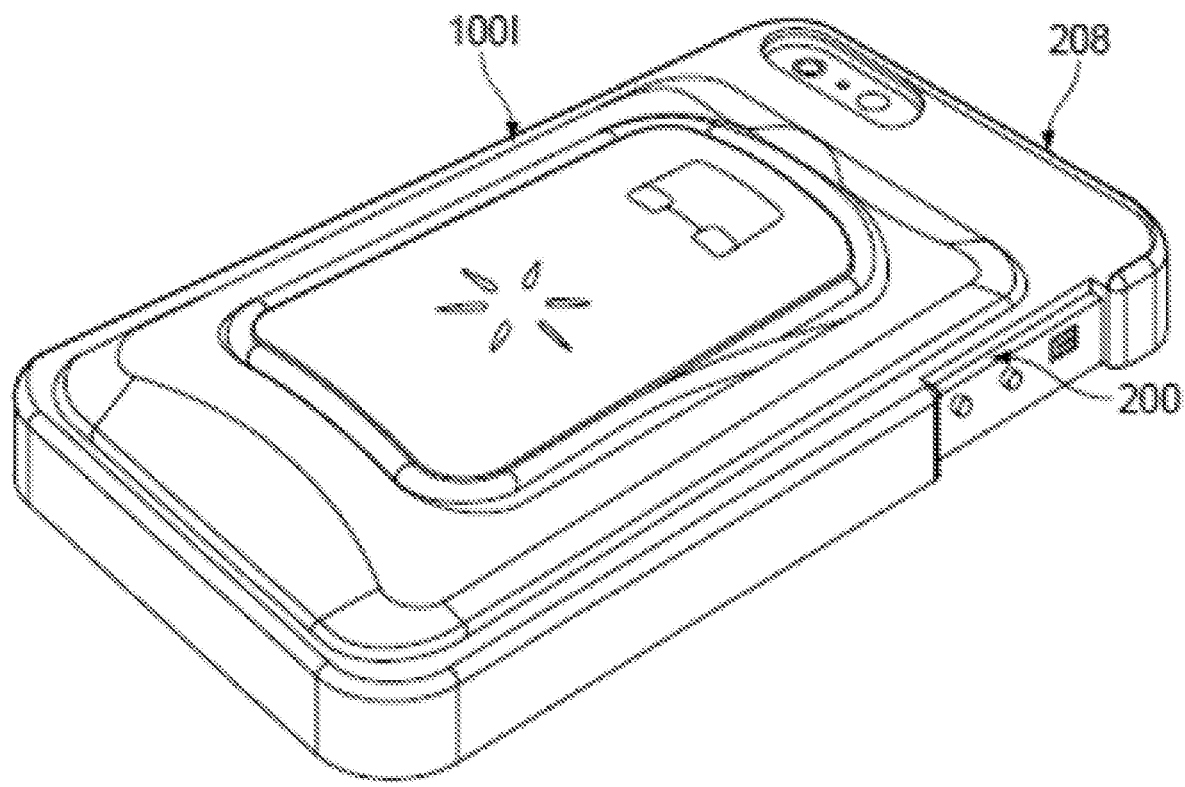
FIG. 21 illustrates a mobile device accessory wherein the mobile device accessory is attached to a case for the mobile device.

As noted above, the form factor of the mobile phone accessory 100 may vary. In this regard, FIG. 10 illustrates an embodiment of the mobile phone accessory 100A including the switch 128 of FIG. 8. FIG. 11 illustrates an embodiment of the mobile phone accessory 100B provided in the form of a case. FIG. 12 illustrates an embodiment of the mobile phone accessory 100C wherein the mobile phone accessory is substantially rectangular with rounded corners. FIG. 13 illustrates an embodiment of the mobile phone accessory 100D wherein the mobile phone accessory is round. FIG. 14 illustrates an embodiment of the mobile phone accessory 100E wherein the user separation sensor arrangement includes a wireless wearable component 120D. FIGS. 15-18 illustrate an embodiment of the mobile phone accessory 100F wherein the mobile phone accessory is ovular. FIG. 19 illustrates an embodiment of the mobile phone accessory 100G wherein the wearable component of the user separation sensor arrangement is not attached for illustration purposes. FIG. 20 illustrates an embodiment of the mobile phone accessory 100H wherein a mobile phone is not attached for illustration purposes. FIG. 21 illustrates an embodiment of the mobile phone accessory 100I wherein the mobile phone accessory is attached to a case 208 for the mobile phone 200.

In examples such as the mobile accessory device 100E and the wearable component 120D of FIG. 14, the connection between the wearable component 120D and the mobile device accessory 100E may be wireless. For example, the connection may be a radio frequency connection (e.g., BLUETOOTH connection), a photonic connection (e.g., infrared beacon, IrDA), sonic (e.g., ultrasonic beacon), or magnetic (e.g., a Hall sensor in the mobile device accessory activated when a magnet in the wearable component is moved too far away).

In some embodiments, the separation sensor arrangement 118 can be configured to measure or otherwise detect a strength of a wireless signal provided by the wearable component. The strength of the signal can be proportional or otherwise representative of the distance between the wearable component and the separation sensor arrangement 118 (e.g., the larger the separation distance, the weaker the received signal will be). The separation sensor arrangement 118 can compare the strength of the received signal to a predetermined threshold signal strength value. If the received signal strength is determined to be less than the threshold signal strength value, the separation sensor arrangement 118 can provide an activation signal to the alarm device 112. In some embodiments, the separation sensor arrangement 118 may be configured to detect the presence and/or absence of a beacon signal, and the threshold signal strength value can be a timeout value. For example, the wearable component 100D can be configured to emit a beacon signal once every second, and the threshold signal strength value can be set to five seconds. In this example, the separation sensor arrangement 118 can determine that no beacon signal has been received for at least five seconds, and respond by determining that the wearable component 100D is no longer in proximity (and/or physically attached) to the mobile accessory device 100E and provide an activation signal to the alarm device 112.

Figure 22A:
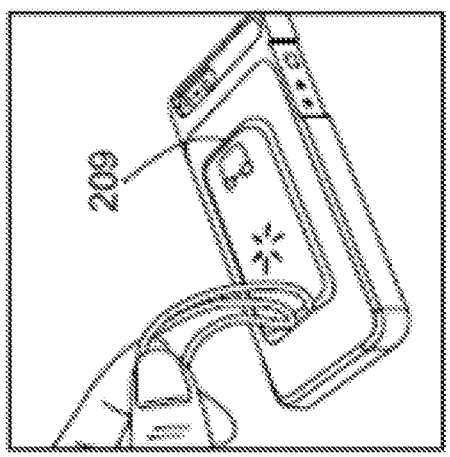
FIGS. 22A-F illustrate steps associated with usage of a wrist strap of the mobile device accessory of FIG. 21.
Figure 22D:
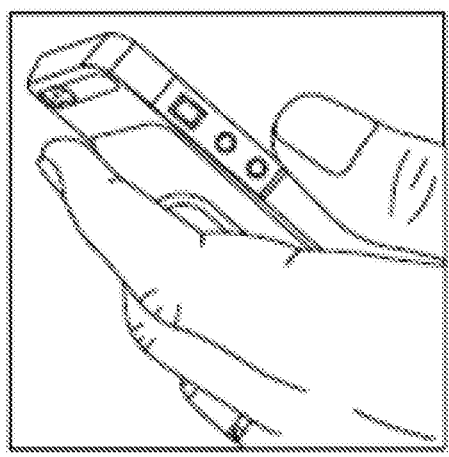
Figure 22B:
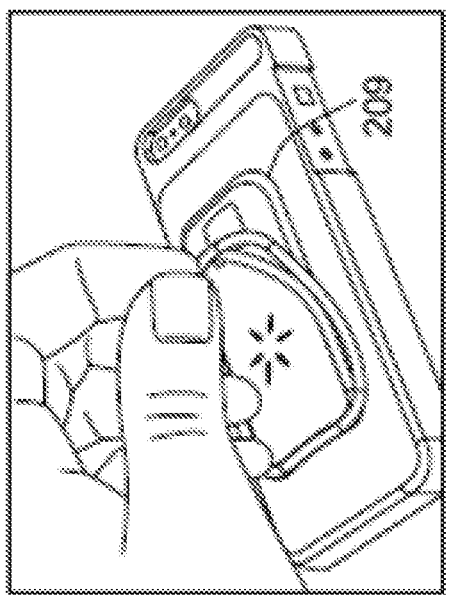
Figure 22E:
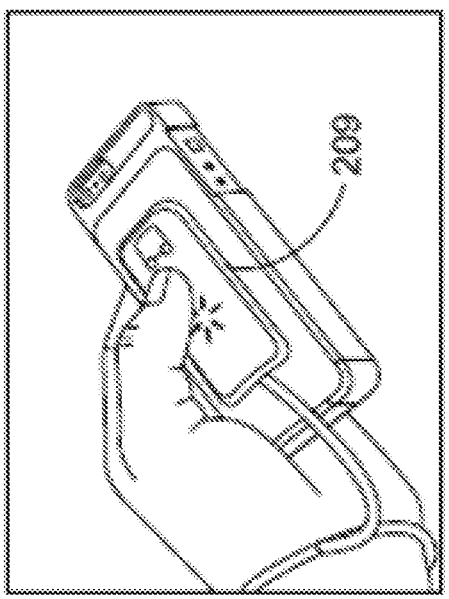
Figure 22C:
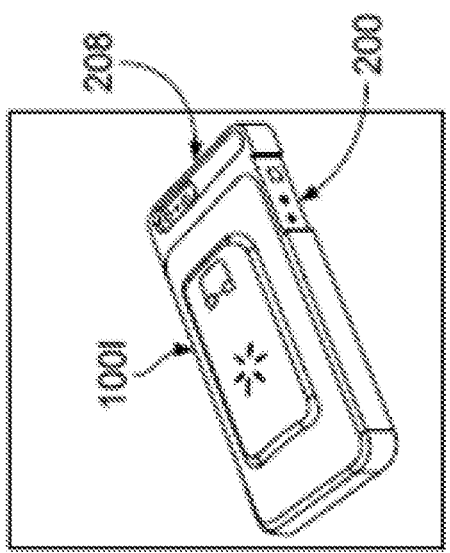
Figure 22F:
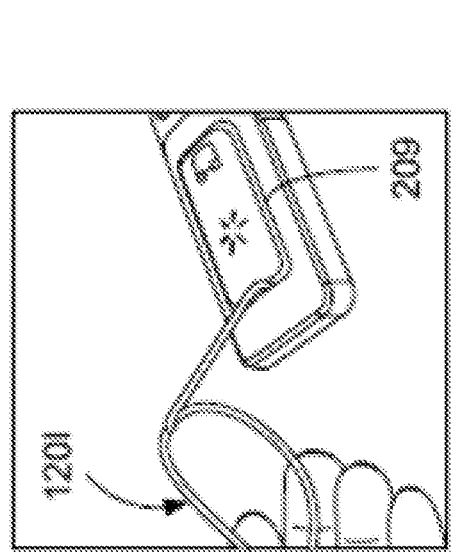

FIGS. 22A-F illustrate steps associated with usage of a wrist strap 120I of the mobile phone accessory 100I of FIG. 21. FIG. 22A shows a mobile phone 200 having an attached (e.g., adhesively, with tabs/slots, or hooks and loops) mobile device accessory 100I. The microphone of the mobile device 200 is shown at 208. The mobile device accessory 100I includes a groove 209 defined in the surface of the mobile device accessory 100I, sized to accommodate storage of the wearable component 120I. FIGS. 22B-D show a user in the process of removing the wearable component 120I from the groove 209 so that he or she can engage the wearable component 120I into a worn position, such as shown in FIG. 22E (e.g., donned upon a wrist). FIG. 22F illustrates how the user might hold mobile device 200 after he or she has removed wearable component 120I form the groove 209 and put it around his or her wrist. The user can later remove (e.g., doff) the wearable component 120I and stow it in the groove 209.

Figure 24:
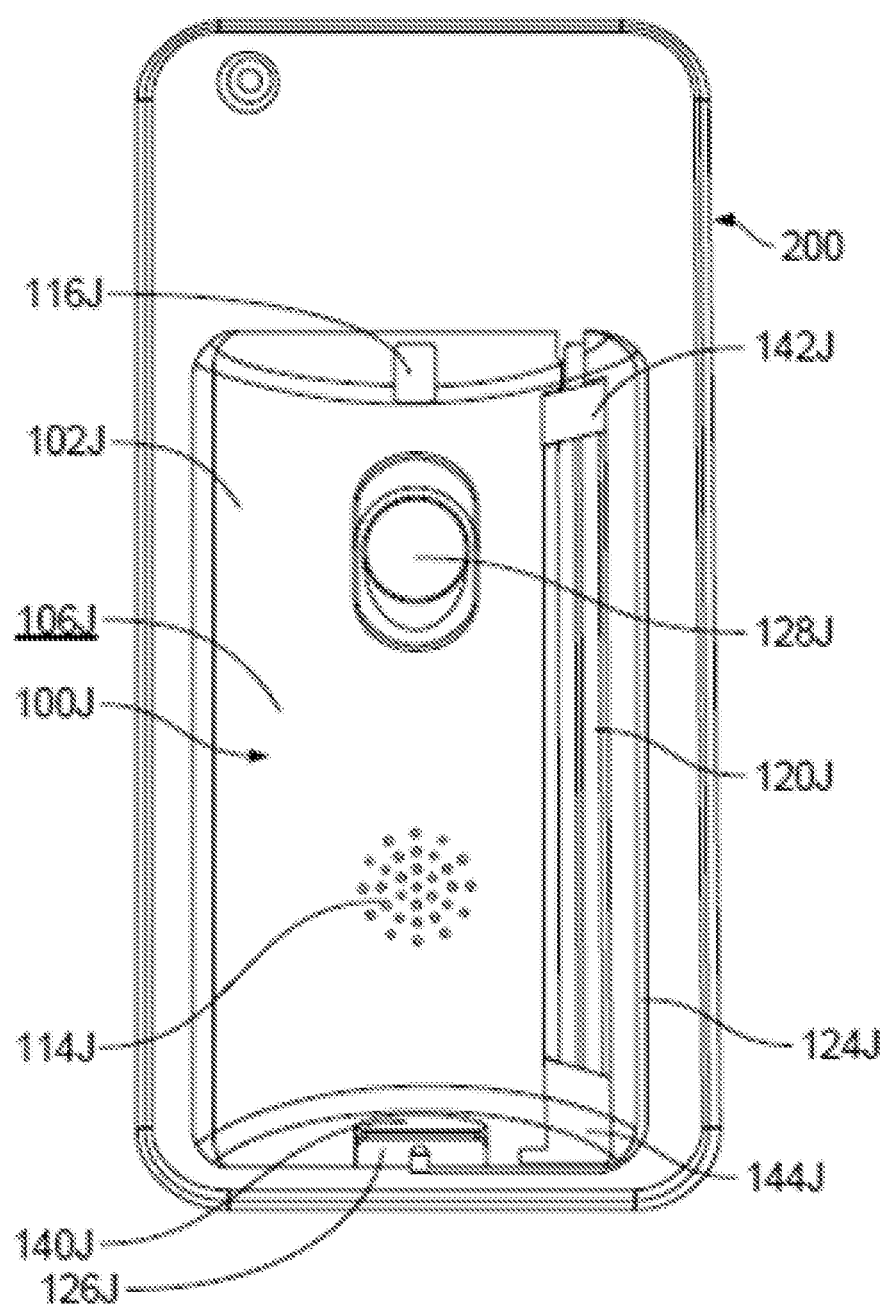
FIG. 24 illustrates a rear view of a mobile device accessory coupled to a mobile device and including a nail slot.
Figure 25:
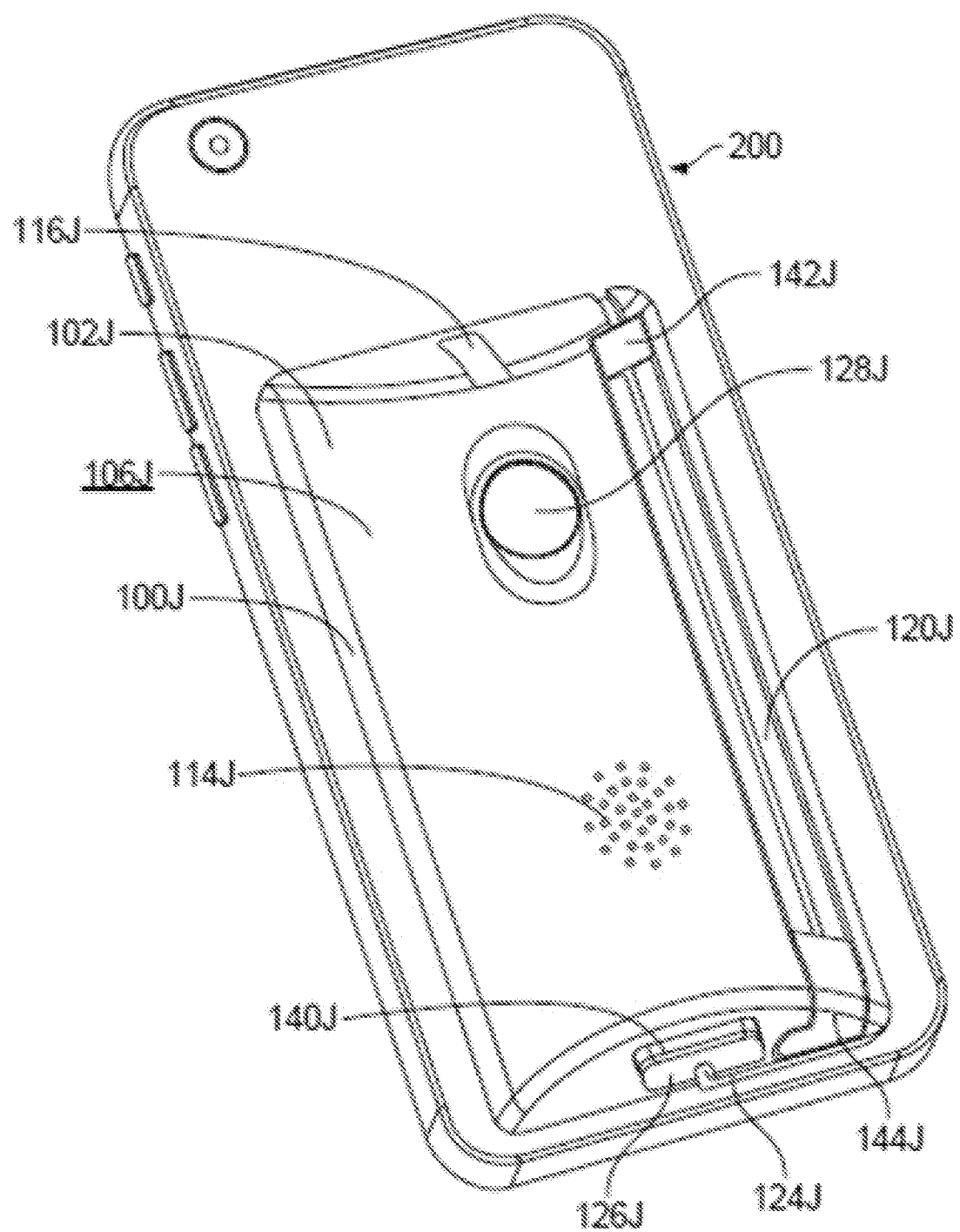
FIG. 25 illustrates a perspective view of a mobile device accessory and mobile device of FIG. 24.
Figure 26:
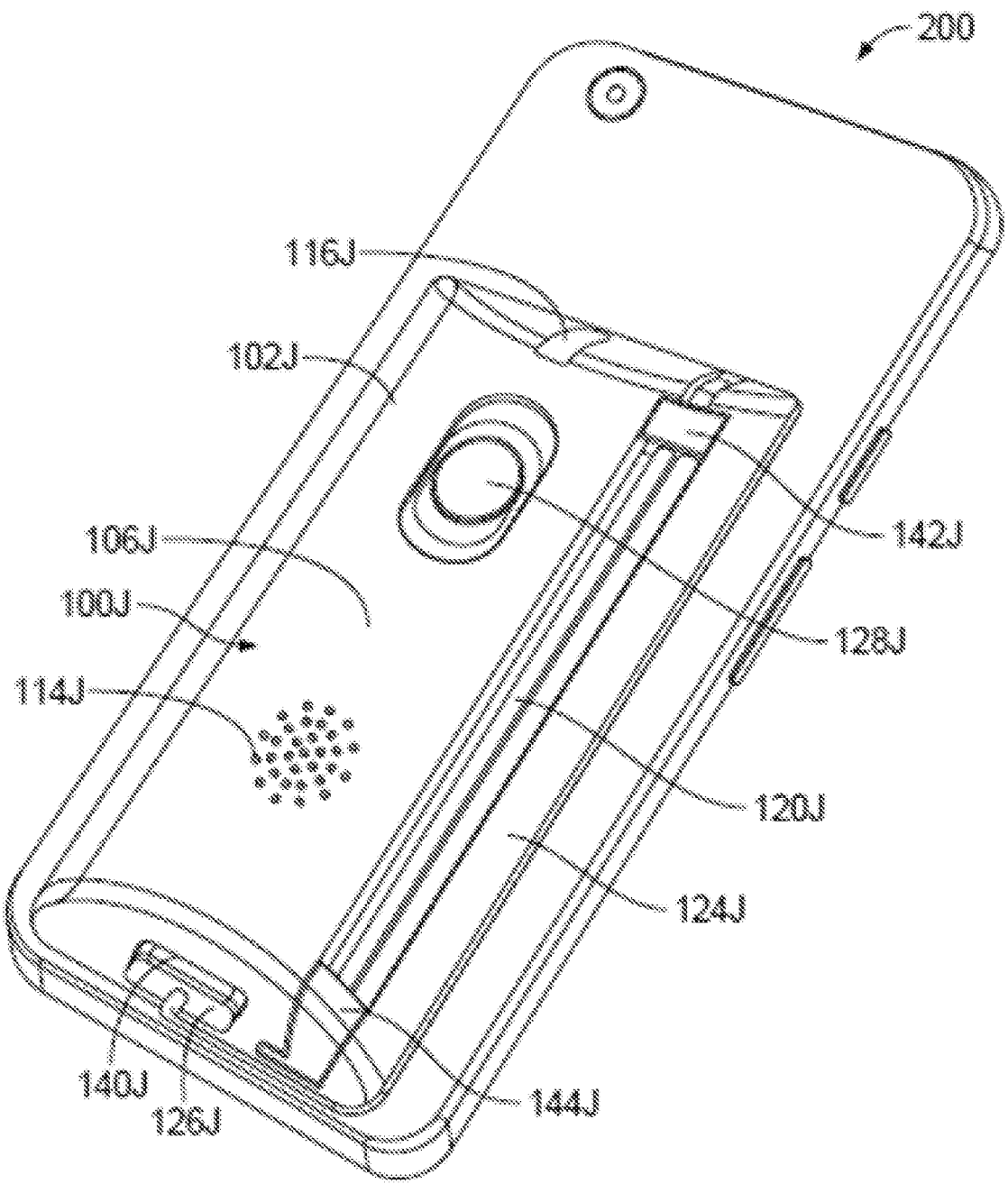
FIG. 26 illustrates an alternate perspective view of the mobile device accessory and mobile device of FIG. 24.

FIG. 23 illustrates an embodiment of a personal safety device 300 that does not require usage of a separate mobile phone, but rather is implemented as a standalone, dedicated personal safety device. Such a personal safety device 300 may have sufficient components and functionalities to perform the operation Further, FIGS. 24-26 illustrate an embodiment of the mobile phone accessory 100J according to an additional example embodiment of the present disclosure. The mobile phone accessory 100J is illustrated as being attached to the mobile phone 200 as discussed above. The overall configuration and features of the mobile phone accessory 100J may be substantially similar to that of the mobile phone accessory 100 of FIG. 1. However, the mobile phone accessory 100J of FIGS. 24-26 may vary in one or more respects.

For example, as illustrated, the position of the components of the mobile phone accessory 100J relative to the housing 102J may vary. In this regard, the light output device 116J may be positioned at a top center of the outer surface 106J of the housing 102J. This configuration may allow the light output device 116J to be exposed and visible above the top of the user's hand in the event of activation while in the user's hand, such that it is more noticeable. The audio output device 114J may be positioned in a similar location as compared to the audio output device 114 of the mobile phone accessory 100 of FIG. 1, but the housing 102J may include a pattern of round holes defined there through that allow sounds to exit the mobile phone accessory 100J. Further, the switch 128J may be substantially similar to the switch 128A described above with respect to FIG. 8, but the ends thereof may be relatively more rounded for improved ergonomics and/or appearance. Additionally, the battery portion may be positioned at the attachment surface of the mobile phone accessory 100J engaged with the mobile phone 200 in order to de-clutter the exposed outer surfaces thereof.

Further, the mobile phone accessory 100J may include a nail slot 140J, which may be positioned between the connector 126J and the housing 102J. In this regard, in some embodiments the user separation sensor arrangement may be activated by engaging a fingernail in the nail slot 140J and releasing the connector 126 rather than requiring the user to release the wearable component 120J first. Thereby, activation of the user separation sensor arrangement may be conducted quickly (e.g., in an unexpected dangerous situation), if necessary.

Further, the particular configuration of the wearable component 120J may differ. In this regard, as illustrated in FIGS. 24-26, in an un-extended configuration, the lanyard 124J may wrap around a lower corner of the housing 102J and extend to and wrap around a top corner of the housing. The wearable component 120J may then extend downward from the lanyard 124J to the bottom edge of the housing 102J. A clip 142J may be positioned at the interface between the lanyard 124J and the wearable component 120J. In some embodiments, the clip 142J may be moveable such that the relative length of the wearable component 120J relative to the lanyard 124J is adjustable and thereby a user may tighten the wearable component around his or her wrist during use. The clip 142J may be configured to engage the housing 102J when in an un-extended configuration to retain the lanyard 124J in place.

Further, the wearable component 120J may include a pull tab 144J at an end thereof. The pull tab 144J may retain the wearable component 120J in the un-extended configuration until the user releases the pull tab from engagement with the housing 102J. Releasing the pull tab 144J from engagement with the housing 102J may activate one or more features. For example, in response to the pull tab 144J being released, the positioning system sensor 210 (see, FIG. 7) may be instructed to activate via the communication mechanisms described above. Accordingly, when a user extends the wearable component 120J and places it on his or her wrist, for example when confronted with a dangerous situation or location, the user's location may be determined and tracked at that time. Thereby, in the event that the user pulls out the connector 126J, the positioning system sensor 210 will have already been activated in order to substantially immediately provide the user's location as described above. Thereby, for example, any delays associated with determining the user's location may be avoided. Further, the user's location may be tracked during the time period during which the pull tab 144J is released and thereby the user's location information may optionally be shared with one or more persons, if desired.

Figure 27:
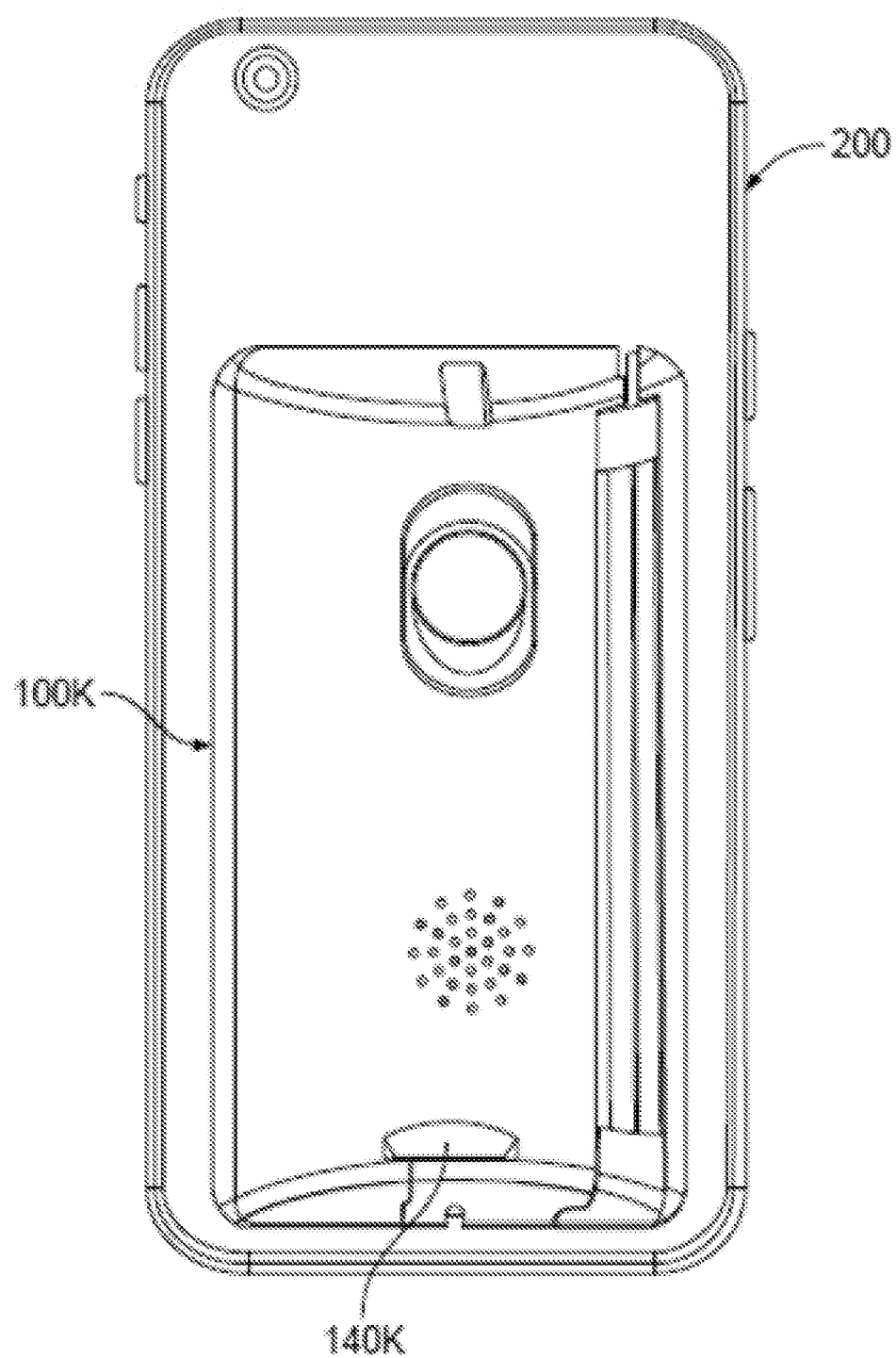
FIG. 27 illustrates a rear view of a mobile device accessory coupled to a mobile device and including an enlarged nail slot.
Figure 28:
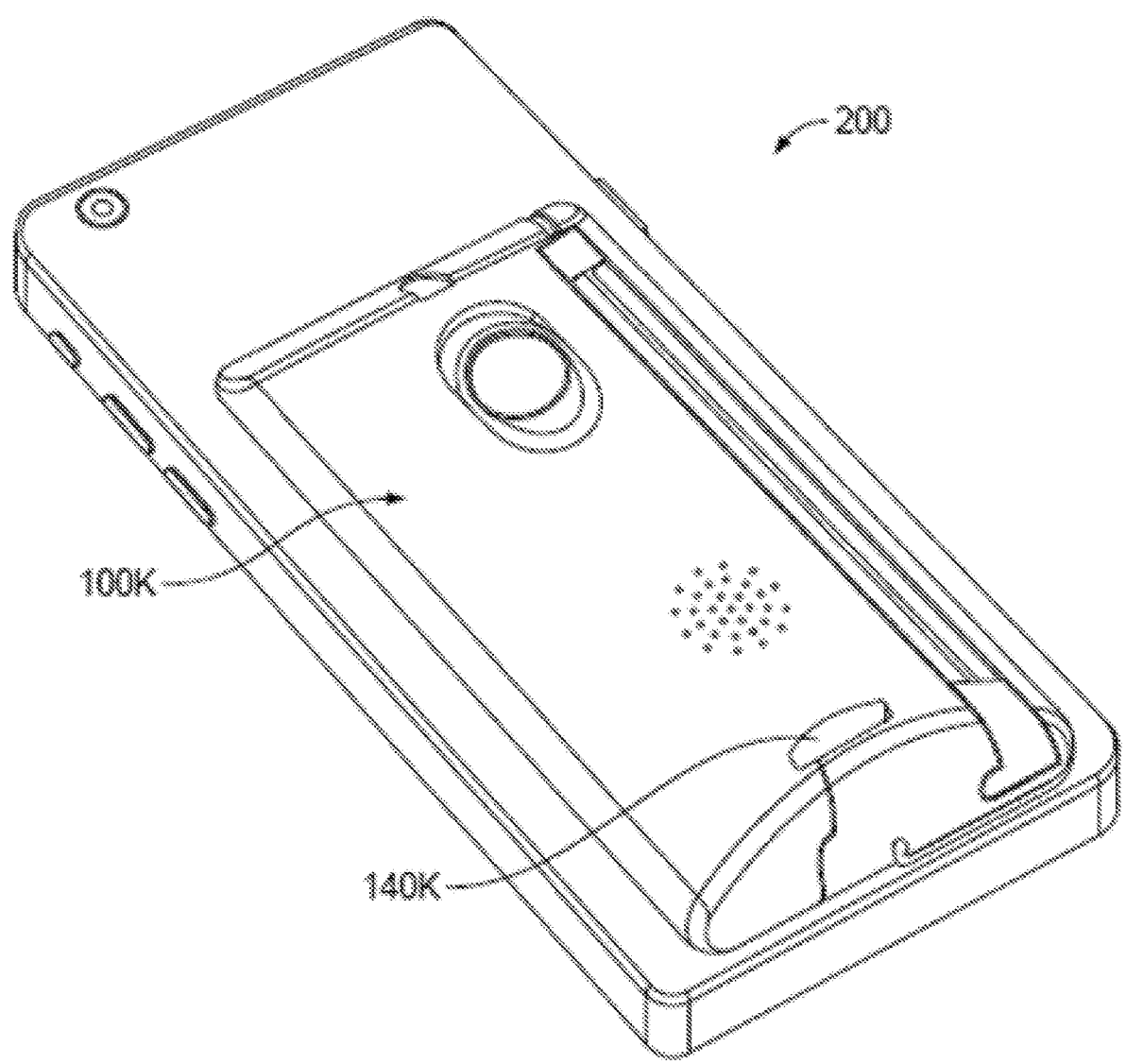
FIG. 28 illustrates a perspective view of the mobile device accessory and mobile device of FIG. 27.
Figure 29:
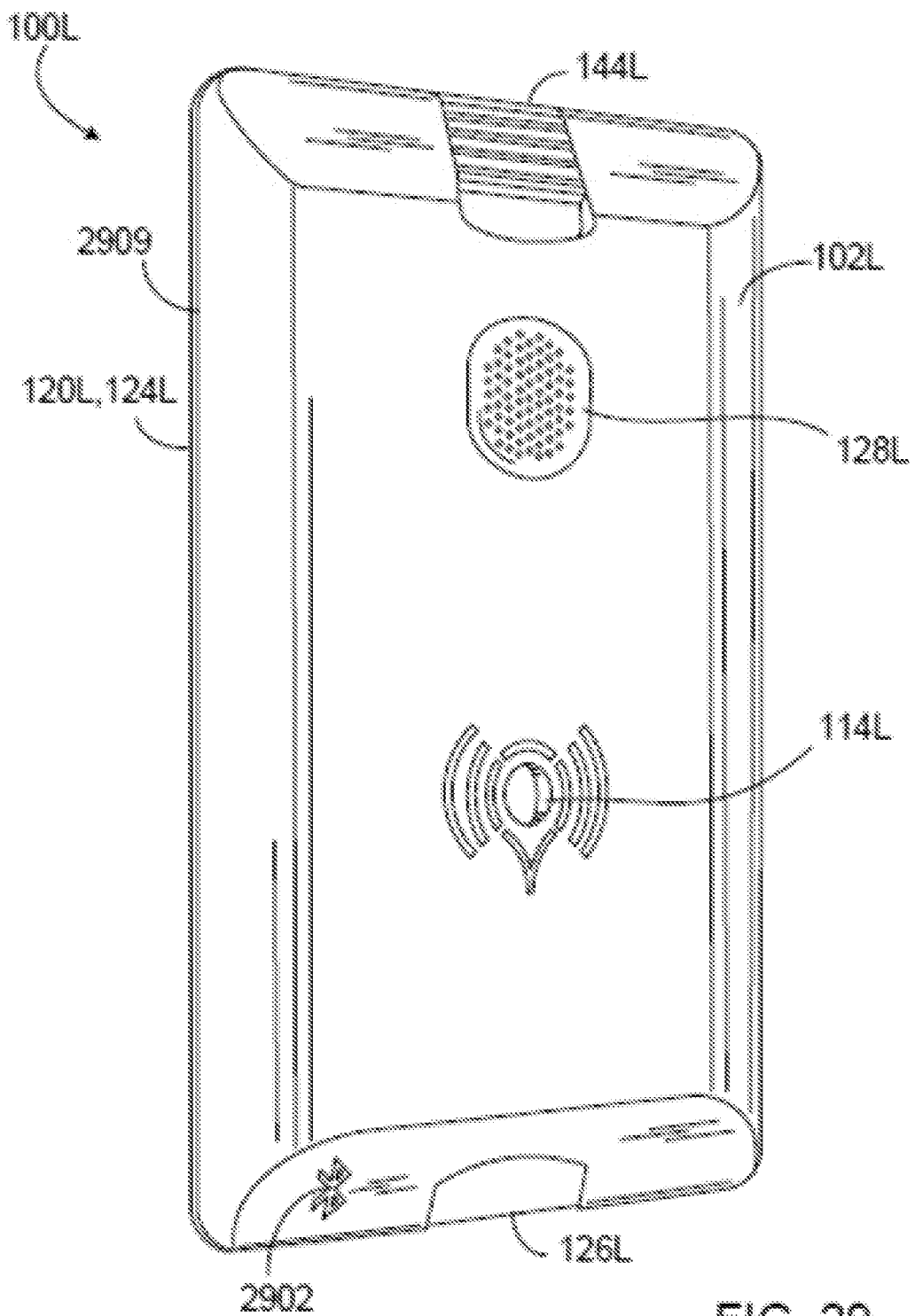
FIG. 29 illustrates a perspective side view of another example mobile device accessory.
Figure 30:
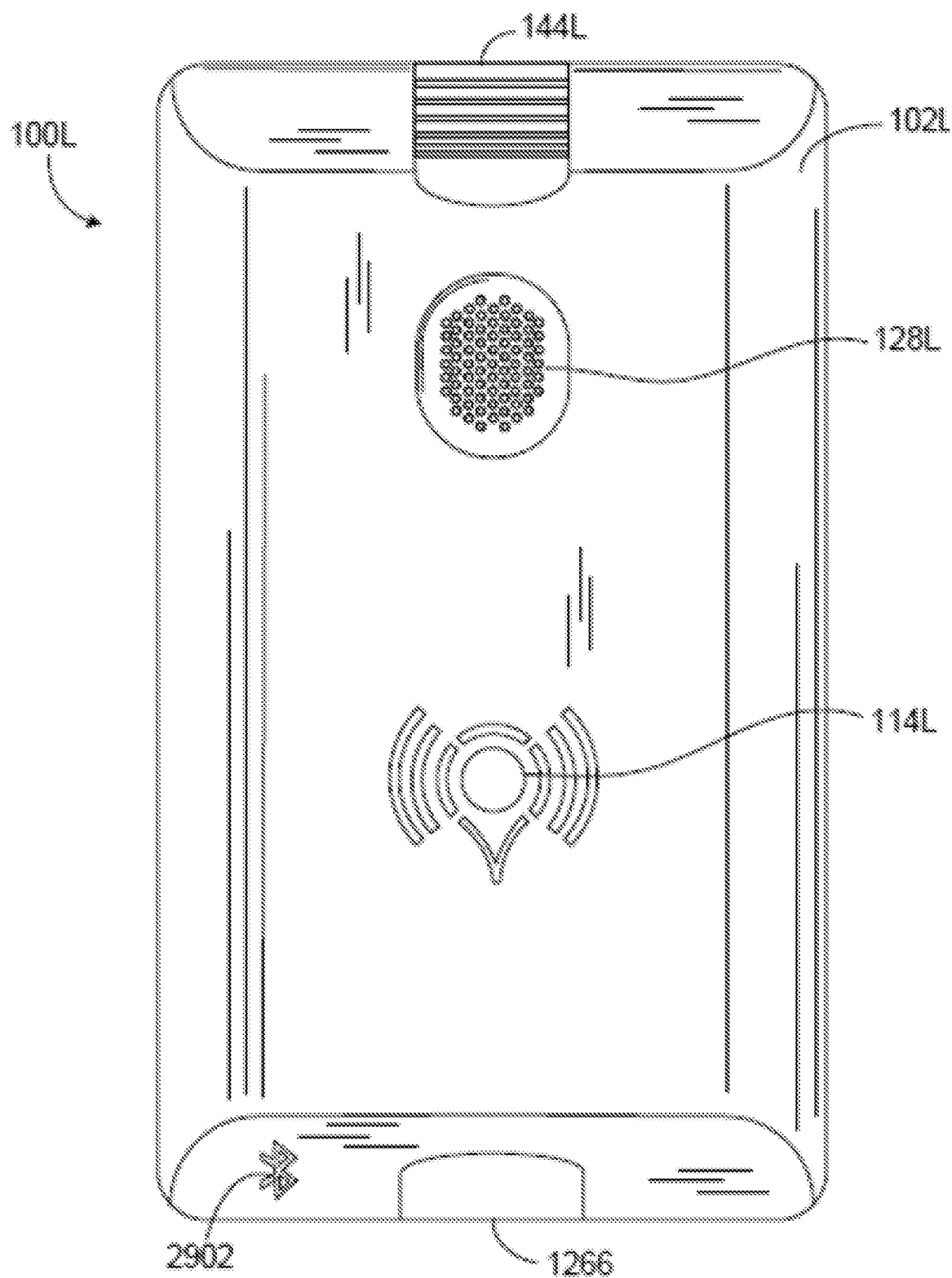
FIG. 30 illustrates a front view of the example mobile device accessory of FIG. 29.
Figure 31:
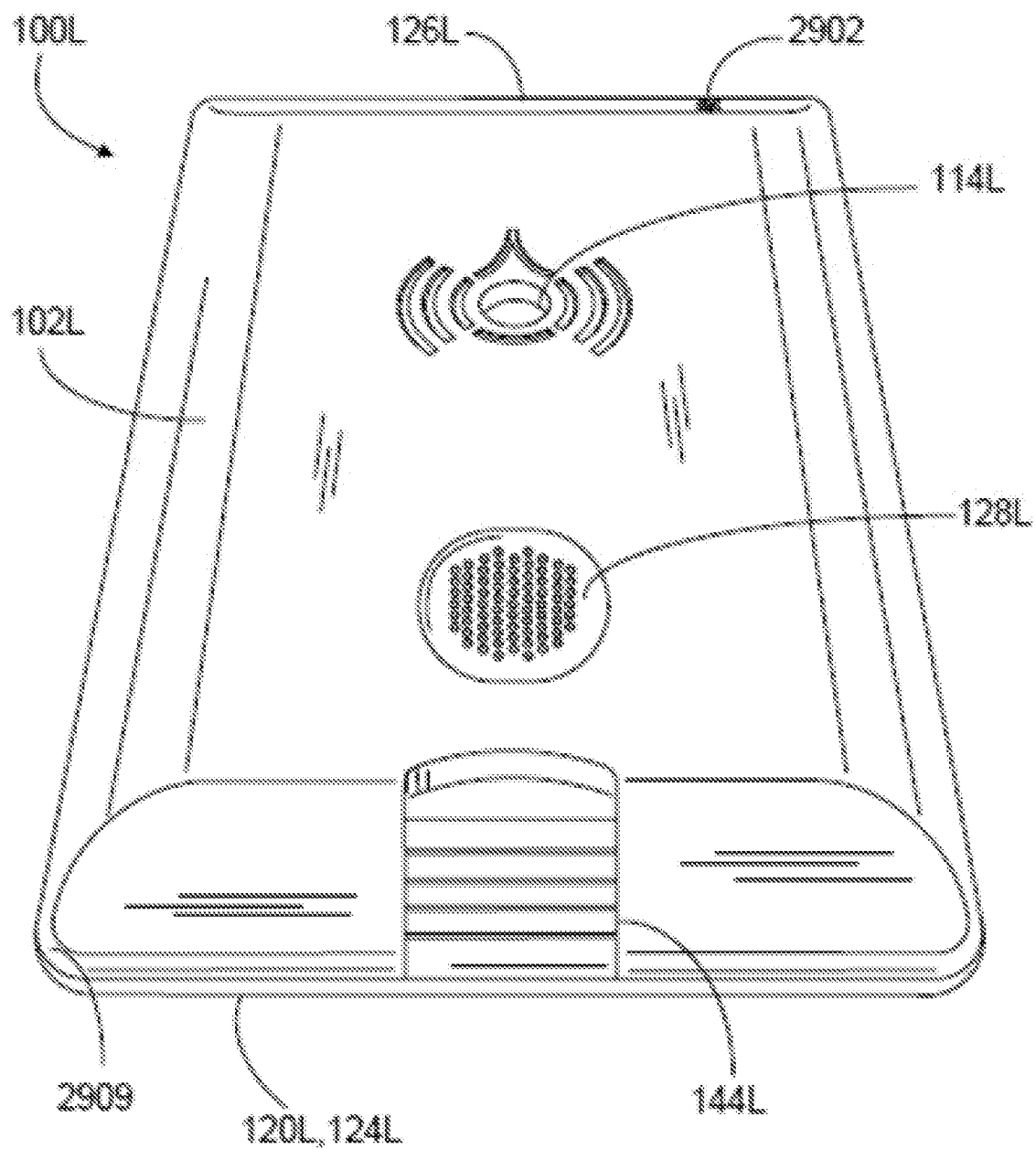
FIG. 31 illustrates a top perspective view of the example mobile device accessory of FIG. 29.
Figure 32:
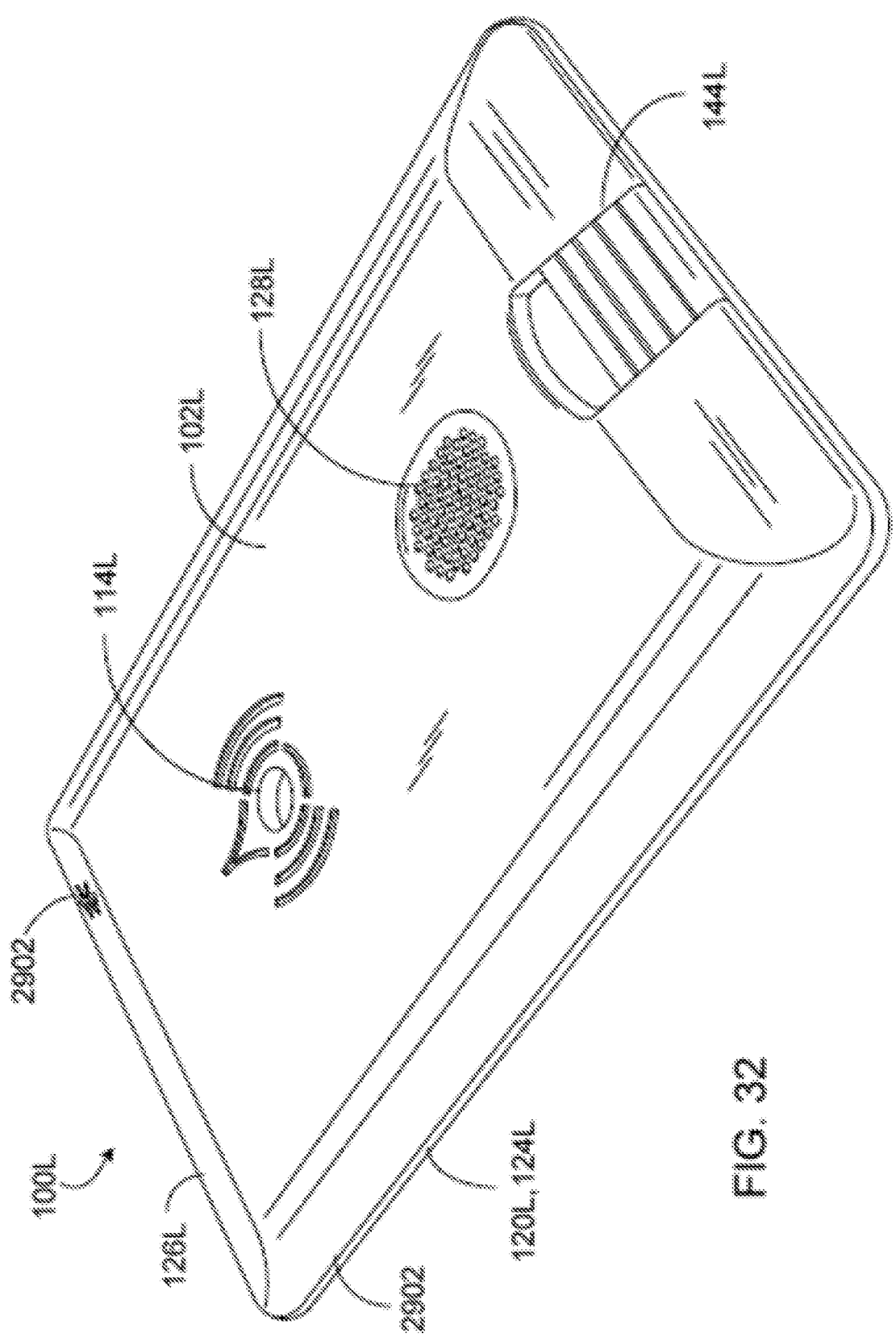
FIG. 32 illustrates an alternate top perspective view of the example mobile device accessory of FIG. 29.
Figure 33:
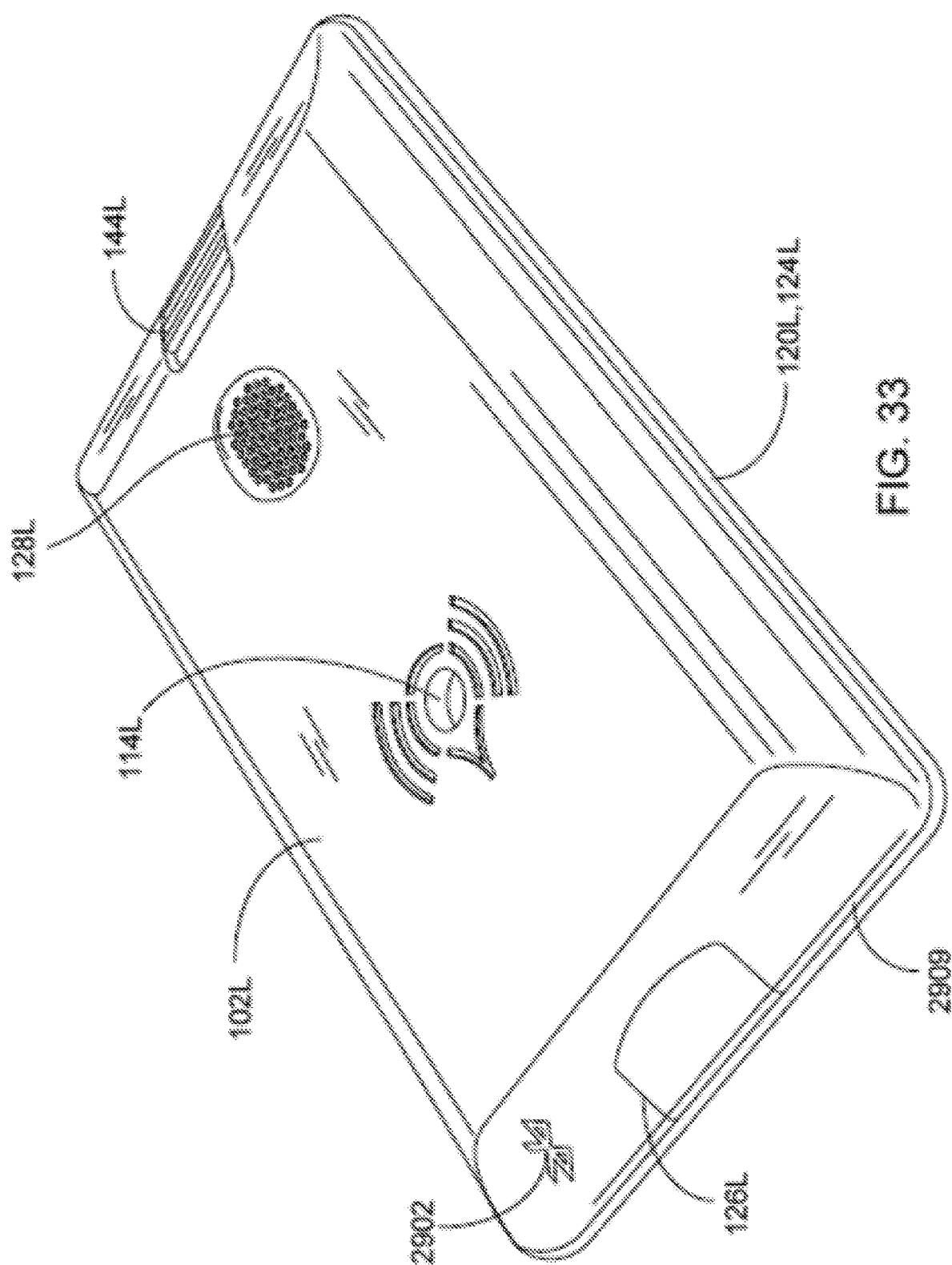
FIG. 33 illustrates a bottom perspective view of the example mobile device accessory of FIG. 29.
Figure 34:
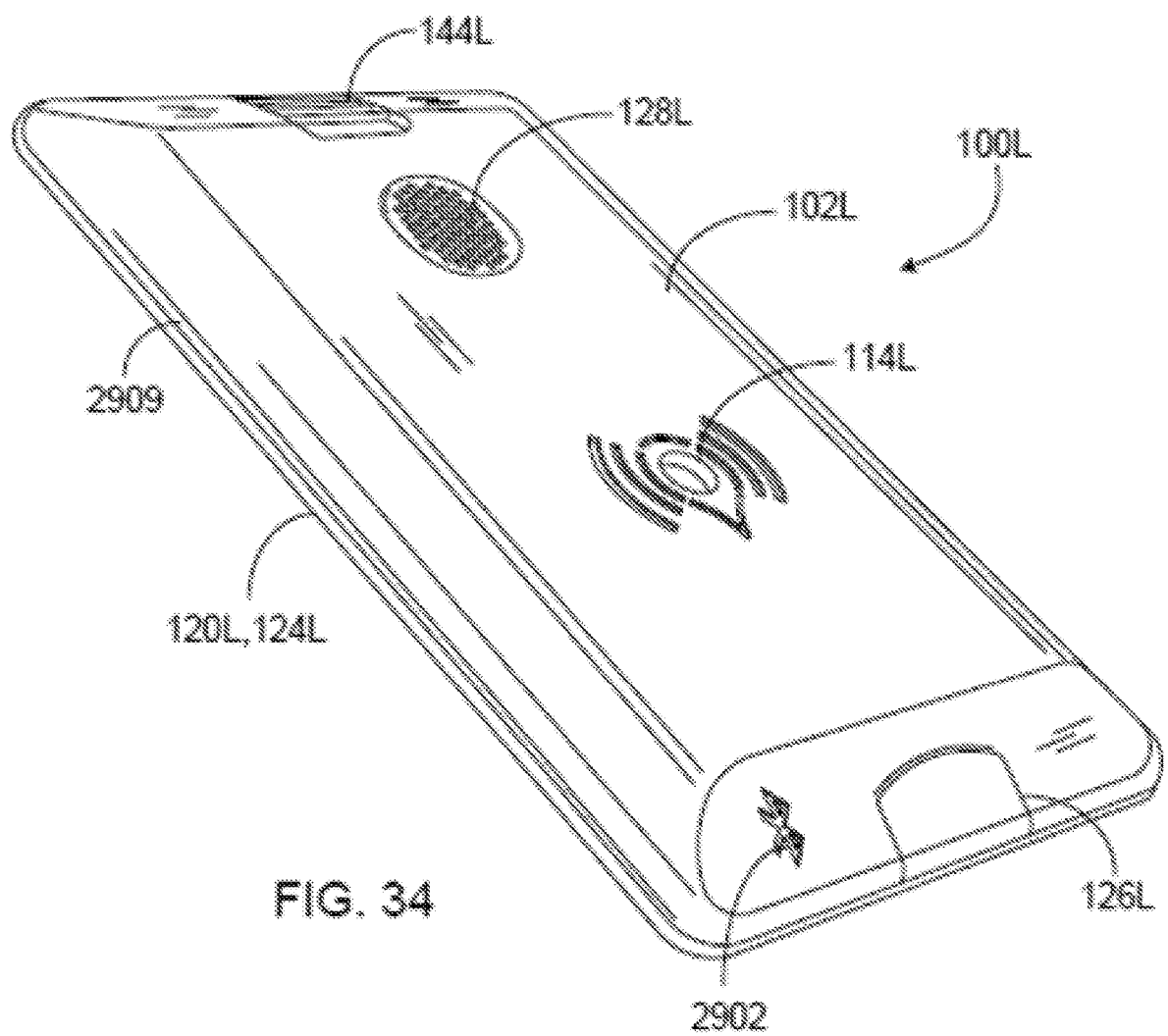
FIG. 34 illustrates an alternate bottom perspective view of the example mobile device accessory of FIG. 29.

The embodiment of the mobile phone accessory 100K illustrated in FIGS. 27 and 28 is substantially similar to the mobile phone accessory of FIGS. 24-26 in most respects and hence the configuration thereof will not be repeated. However, the nail slot 140K is enlarged.

FIGS. 29-35 illustrate various views of another example mobile device accessory 100I according to an additional example embodiment of the present disclosure. The mobile phone accessory 100L is configured to be attached to the mobile phone 200 as will be discussed further below. The overall configuration and features of the mobile phone accessory 100L may be substantially similar to that of the mobile phone accessory 100 of FIG. 1. However, the mobile phone accessory 100L of FIGS. 29-35 may vary in one or more respects.

For example, as illustrated, the position of the components of the mobile phone accessory 100L relative to the housing 102L may vary. The audio output device 114L may be positioned in a similar location as compared to the audio output device 114 of the mobile phone accessory 100 of FIG. 1, but the housing 102L may include a round hole defined there through that allow sounds to exit the mobile phone accessory 100L.

Further, the particular configuration of the wearable component 120L may differ. In this regard, as illustrated in FIGS. 29-35, in an un-extended configuration, wearable component 120L and the lanyard 124L may be stow-able in a groove 2909 formed about the periphery of the housing 102L. Further, the wearable component 120L may include a pull tab 144L at an end thereof. The pull tab 144L may retain the wearable component 120L in the stowed (e.g., un-extended) configuration until the user releases the pull tab 144L from engagement with the housing 102L. Releasing the pull tab 144L from engagement with the housing 102L may activate one or more features. For example, in response to the pull tab 144L being released, the positioning system sensor 210 (see, FIG. 7) may be instructed to activate via the communication mechanisms described above. Accordingly, when a user removes the wearable component 120L from the groove 2909 and places it on his or her wrist, for example when confronted with a dangerous situation or location, the user's location may be determined and tracked at that time. Thereby, in the event that the user pulls out the connector 126L, the positioning system sensor 210 will have already been activated in order to substantially immediately provide the user's location as described above. Thereby, for example, any delays associated with determining the user's location may be avoided. Further, the user's location may be tracked during the time period during which the pull tab 144L is released and thereby the user's location information may optionally be shared with one or more persons, if desired.

Further, the switch 128L may be a pressure sensitive or membrane switch defined as a fingertip-sized recess having a textured pattern (e.g., to ease identification and location of the switch 128L by either sight or touch). In use, the switch may be used to activate an alarm though a predetermined continuous press (e.g., three seconds) or through a predetermined series of presses (e.g., three presses within five seconds), for example to reduce the occurrence of accidental activation. In some implementations, the switch 128L may activate a different type of alarm than may be triggered by separation of the lanyard. For example, the mobile device accessory 100L may respond to activation of the switch 128L by initiating a silent alarm to alert one or more predetermined recipients (e.g., discreetly sending a message to a preselected contact), while the mobile device accessory 100L may respond to separation of the connector 126L by initiating an audible alarm and alerting one or more predetermined recipients (e.g., set off a siren and send a message or place a phone call to police).

Further, the mobile phone accessory 100L may include a nail slot positioned between the connector 126L and the housing 102L. In this regard, in some embodiments the user separation sensor arrangement may be activated by engaging a fingernail in the nail slot and releasing the connector 126L rather than requiring the user to release the wearable component 120L first. Thereby, activation of the user separation sensor arrangement may be conducted quickly (e.g., in an unexpected dangerous situation), if necessary.

The mobile device accessory 100L also includes a visual indicator 2902 (e.g., a light, a display). The visual indicator 2902 is configured to provide a visible indication of one or more statuses of the mobile device accessory. For example, the visual indicator 2902 may blink at a first rate or pattern (e.g., or illuminate steadily), illuminate at a first brightness, and/or illuminate with a first color to display a first condition (e.g., to indicate that the mobile device accessory 100L is connected to or paired with the mobile phone 200 and/or an associated alarm software application running on the phone), and blink, illuminate, and/or colorize in different predetermined manners to display other conditions (e.g., to indicate that the mobile device accessory 100L is not paired or otherwise communicatively associated with mobile phone 200, to indicate that the mobile device accessory 100L is not able to communicate with the mobile phone 200 to which it was previously paired or otherwise communicatively associated). In some embodiments, the visual indicator 2902 may display differently shaped predetermined patterns to indicate different conditions of the mobile device accessory 100L. For example, the visual indicator 2902 may appear as a periodically blinking, blue BLUETOOTH symbol to indicate that the mobile device accessory 100L is ready for pairing, and may appear as a red "X" when the mobile device accessory 100L is not able to communicate with the paired mobile phone 200 or an associated software application installed thereupon and configured to respond to alarm signals from the mobile device accessory 100L.

Figure 35:
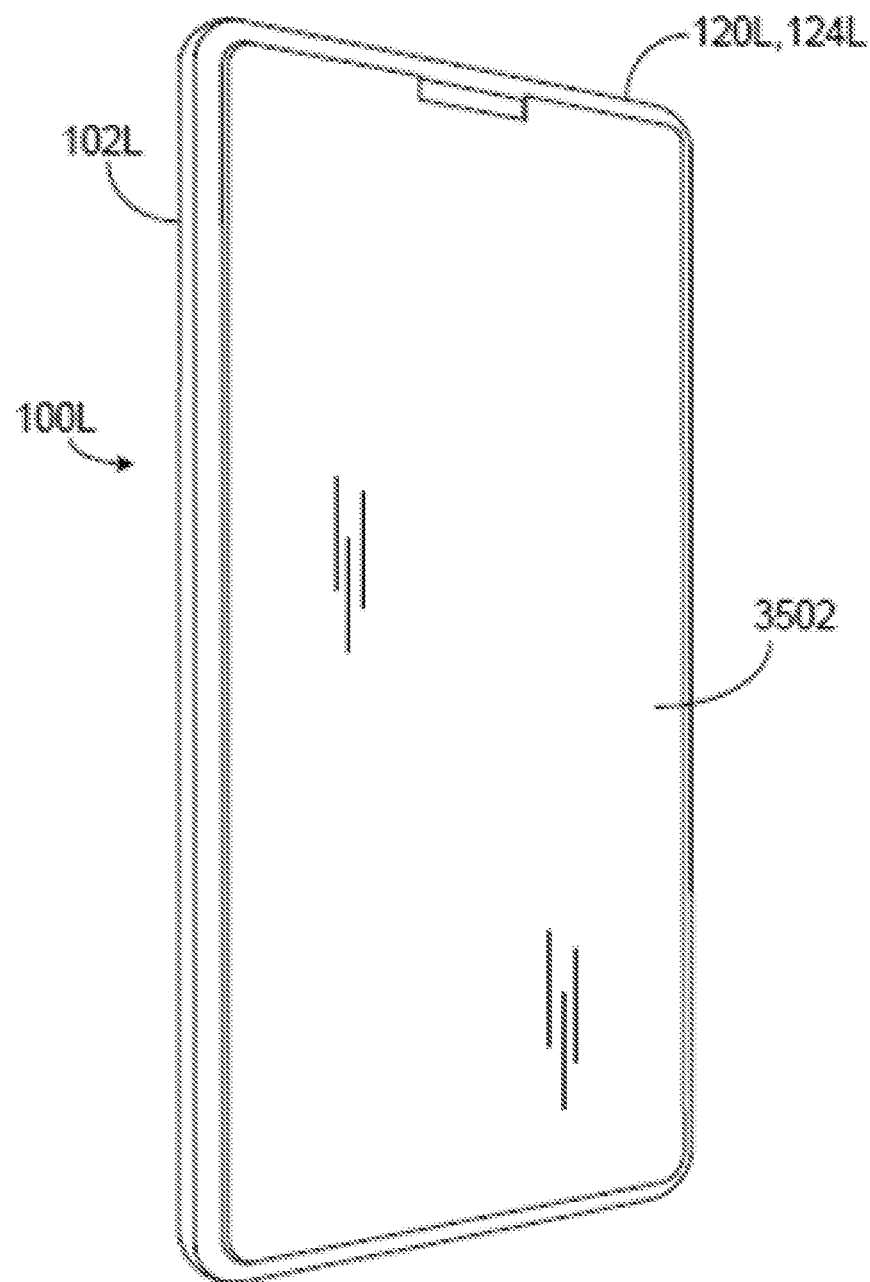
FIG. 35 illustrates a perspective rear view of the example mobile device accessory of FIG. 29.

Referring now to FIG. 35, a rear perspective view of the mobile device accessory 100L is shown. The rear side of the housing 102L includes an adhesive pad 3502. In use, the adhesive pad 3502 can be contacted against a surface of the mobile phone 200 (e.g., the rear surface 202).

Figure 36:
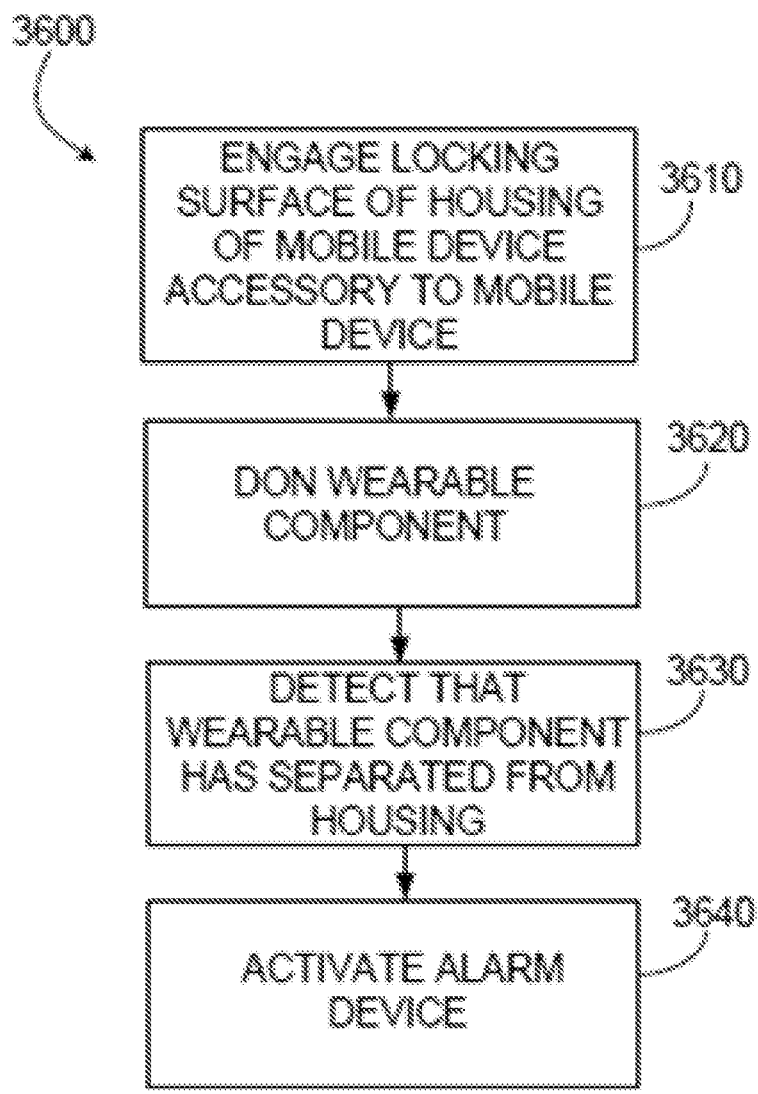
FIG. 36 is a flow chart of an example process for using an example mobile device accessory.

FIG. 36 is a flow chart of an example process 3600 for using an example mobile device accessory. In some implementations, the process 3600 can be performed using one or more of the example mobile device accessories 100A-100L of FIGS. 1-23, and 25-35, and the personal safety device 300 of FIG. 23.

At 3610, an attachment surface of a housing of a mobile device accessory is engaged to a mobile device. For example, the attachment surface 104 of the housing 102 may be configured to engage the rear surface 202 of the mobile phone 200. In another example, the adhesive pad 3502 shown in FIG. 35 can be used to secure the mobile device accessory 100L to a mobile device, such as to the rear surface 202 of the mobile device 200.

At 3620, a wearable component is donned upon a user of the mobile device. For example, the wearable component 120 of FIG. 5, the wireless wearable component 120D of FIG. 14, and/or the wrist strap 120I of FIGS. 22A-F can be worn about a user's wrist. In other examples, the wearable component can donned upon or otherwise carried by a user (e.g., a pendant, a ring, an earring, an earpiece, bracelet, wristwatch, eyeglass frame, hair clip), the user's clothing (e.g., a remote unit carried in the user's pocket, a pin, a badge, clipped to a belt, a belt buckle, head band, hat), and/or the user's personal effects (e.g., a remote unit carried in purse or bag, a key fob, an identification card).

At 3630, a separation sensor detects that the wearable component has separated from the housing. For example, the connectivity sensor 122 can determine that the wearable component 120 has exceeded a threshold separation distance from the alarm device 112 and/or that the wearable component 120 has become physically detached from the mobile device accessory 100.

In some embodiments, the process 3600 can include detecting a mechanical separation of the housing and a lanyard affixed to the wearable component, the lanyard having a predetermined length and mechanically connecting the wearable component to the housing, the lanyard being mechanically separable from the housing when distance between the wearable component and the housing exceeds the predetermined length. For example, the connectivity sensor 122 can determine that the wearable component 120 has become detached, disengaged, or otherwise physically separated from the alarm device 112.

In some embodiments, detecting that the wearable component has separated from the housing can include determining a signal strength of a wireless tether signal transmitted by a wireless transmitter of the wearable component to a wireless receiver arranged within the housing and in communication with the separation sensor, the signal strength being representative of a distance between the wearable component and the housing, and determining that the signal strength is less than or equal to a predetermined signal strength defining a predetermined separation distance. For example, the separation sensor arrangement 118 can determine that the wearable component 120D has exceeded a threshold separation distance from the alarm device 112, or that a periodic beacon transmitted by the wearable component 120D has not been received for a predetermined length of time.

At 3640, an alarm device is activated based on detecting that the wearable component has separated from the housing. For example, the alarm device 112 of FIG. 7 can be activated. In some embodiments, activating the alarm device can include transmitting an alarm signal; and wherein the process 3600 can also include receiving, by mobile device, the alarm signal, and sending, by the mobile device and in response to the receiving the alarm signal, a predetermined communication to one or more predefined recipients. For example, the alarm device 112 of FIG. 7 can activate the communication interface 134 to communicate with the mobile phone 200. The mobile phone 200 may have a software application installed and executing thereupon, and the software application can be configured to react to the communication from the mobile device accessory 100E to cause the mobile phone to communicate with one or more predetermined recipients. For example, the software application may be configured to initiate a call, send a text message, email, media file, media stream, location information (e.g., GPS data), captured audio and/or video, or any other appropriate information to one or more contacts previously identified by the user (e.g., family member, friend, neighbor, doctor, nurse, caregiver, welfare official, emergency services, 911)

In some embodiments, activating the alarm device can include activating an audio output component disposed within the housing and configured to emit an audible alert when activated. For example, the alarm device 112 includes the audio output device 114 that can emit a siren, noise, prerecorded or synthesized spoken words or other sounds, or any other appropriate sound that is sufficiently loud enough to attract the attention of other nearby persons and/or repel an attacker. In some embodiments, activating the alarm device can include activating a visual output configured to emit an audible alert when activated. For example, the alarm device 112 includes the light output device 116 that can emit a light or strobe to attract the attention of other nearby persons and/or repel an attacker.

In some embodiments, the process 3600 can include removing the wearable component from a cavity defined by the housing, wherein the cavity is sized to accommodate storage of the wearable component. For example, FIGS. 22A-22F show that the example wearable component 120I can be at least partly removed from the mobile device accessory 100I before being worn about the wrist of the user. In some embodiments, the process 3600 can also include doffing the wearable component from the user, and stowing the wearable component in a cavity defined by the housing, wherein the cavity is sized to accommodate storage of the wearable component. For example, the process illustrated by FIGS. 22A-22F can be reversed such that the user can take the wearable component 120I or 120L off his or her wrist, and placed back in the groove 209 or 2909 defined in the housing of the mobile device accessory 100I or 100L.

FIGS. 37a-45 illustrate various views of another example mobile device accessory 100M according to an additional example embodiment of the present disclosure. The mobile phone accessory 100M is configured to be attached to the mobile phone 200, either directly or indirectly, as will be discussed further below. The overall configuration and features of the mobile phone accessory 100M may be substantially similar to, or a subset of, that of the mobile phone accessory 100 of FIG. 1. However, the mobile phone accessory 100M of FIGS. 37a-45 may vary in one or more respects.

The mobile device accessory 3701 includes a connectivity sensor having a removable component 144M (e.g., a pull tab), which serves as a user input mechanism, and is configured to activate when the removable component 144M is at least partially removed, and an alarm device (not shown) disposed in the housing 102M and configured to activate in response to activation of the connectivity sensor. Activation of the alarm device can cause an audible alarm, or cause a software application to be executed on the mobile device 200, or both. The audible alarm can come either from an optional audio emitting device disposed in the mobile phone accessory 100M or (e.g., in embodiments where the mobile phone accessory 100M does not include an audio emitting device) from the mobile device 200, e.g., using a speaker built into the mobile device 200.

For example, as illustrated, the position of the components of the mobile phone accessory 100M relative to a housing 102M may vary. A pull tab 144M is configured to remain in a stowed (e.g., un-extended) configuration until the user releases the pull tab 144M from engagement with the housing 102M or moves the pull tab 144M relative to the housing 102M. Releasing or moving the pull tab 144M may activate one or more features. For example, in response to the pull tab 144M being removed (at least in part), shifted, or released, the positioning system sensor 210 (see, FIG. 7) may be instructed to activate via the communication mechanisms described above. Further, the user's location may be tracked, e.g., using GPS-like functionality built into the mobile device 200, during the time period in which the pull tab 144M is released and thereby the user's location information may optionally be shared with one or more persons, if desired, e.g., using the communications capabilities of the mobile device 200 (e.g., phone, email, SMS text).

Further, the mobile phone accessory 100M may include a slot 126M or a feature providing equivalent functionality, positioned between the pull tab 114M and the housing 102M. In this regard, in some embodiments the user separation sensor arrangement may be activated, for example, by engaging a fingernail or equivalent in the slot 126M and. Thereby, based on user input, activation of the user separation sensor arrangement may be conducted quickly (e.g., in an unexpected dangerous situation), if necessary, for example, by removing (at least in part) the pull tab 144M.

In some embodiments, the slot 126M, which serves as a user input mechanism, may be supplemented or substituted with one or more other mechanical features configured to provide frictional, grippable, or graspable surface or element to ease releasing or moving the pull tab 144M. Examples of such mechanical features can include raised or recessed ribs, dimples, latches, loops, hooks, projections, textures (e.g., rough, soft, sticky), or combinations of these or other mechanical features that can promote manual operation (e.g., movement or removal) of the pull tab 144M.

Alternatively, or in addition, other use input mechanisms (e.g., switches or buttons) may be used as a user input mechanism to trigger actuation of the mobile device accessory 100M. In one such embodiment, a switch 128M (e.g., a button) is arranged on a lateral side 3710a of the housing 102M, substantially perpendicular to a major face surface 3712. Another switch 129M is arranged on a lateral side 3710b of the housing 102M, substantially perpendicular to the major face surface 3712 opposite the switch 129M. The switch 128M and/or the switch 129M may be a depressible button, pressure sensitive, or membrane switches defined as a fingertip-sized recess or protrusion having a textured pattern (e.g., to facilitate identification and location of the switch by either sight or touch). In use, the switch 128M and the switch 129M are pressed substantially simultaneously. For example, in the illustrated configuration, a user can squeeze the switch 128M and the switch 129M with two different fingers of one hand in order to activate an alarm, thereby reducing a likelihood of false alarms due to accidental actuation of a single button. The switches may be used to activate an alarm though a predetermined continuous press (e.g., three seconds), through a predetermined series of presses (e.g., three presses within five seconds), or through a particular sequence of presses (e.g., first pressing switch 128M and then switch 129M), for example, to reduce the occurrence of accidental activation.

In some implementations, the switches 128M and 129M may activate a different type of alarm than may be triggered by separation of the pull tab 114M. For example, the mobile device accessory 100M may respond to activation of the switches 128M and 129M by initiating a silent alarm to alert one or more predetermined recipients (e.g., causing the mobile device 200 to discretely send a message to a preselected contact), while the mobile device accessory 100M may respond to partial removal of the pull tab 114M by initiating an audible alarm and alerting one or more predetermined recipients (e.g., set off a siren and send a message or place a phone call to police). The audible alarm can come either from an optional audio emitting device disposed in the mobile phone accessory 100M or (e.g., in embodiments where the mobile phone accessory 100M does not include an audio emitting device) from the mobile device 200, e.g., using a speaker built into the mobile device 200.

In some embodiments, the removable component (e.g., pull tab 114M) can be configured to be at least partly removed from the housing 102M when subjected to a predetermined removal force. In some embodiments, the mobile device accessory 100M can include a wearable component having a lanyard (e.g., the example wearable component 120) configured to mechanically attach to the housing 102M and/or the pull tab 114M and provide at least the predetermined removal force to the removable component based on a pull of upon the lanyard and at least partly remove the removable component from the housing 102M based on the pull.

Figure 37A:
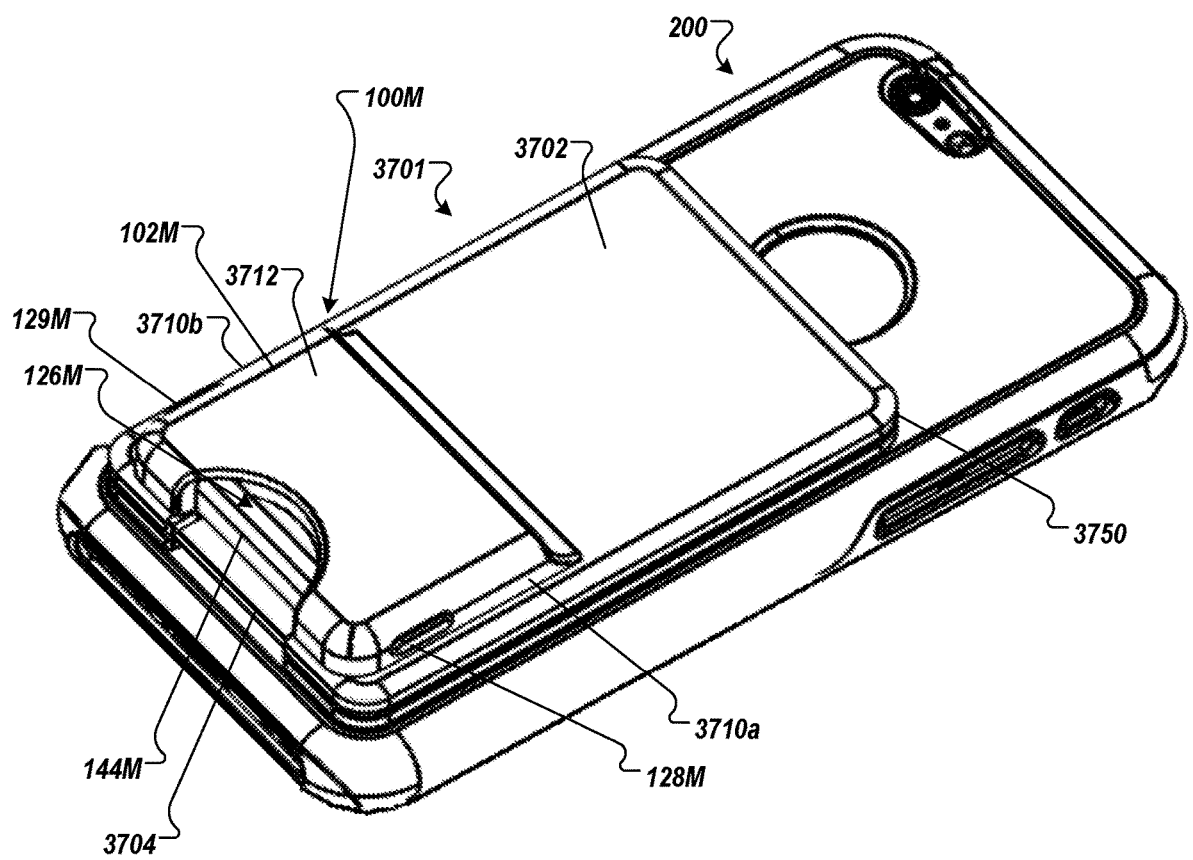
FIGS. 37a and 37b illustrate a personal safety device that engages a portion of a mobile device or a companion mobile accessory.
Figure 37B:
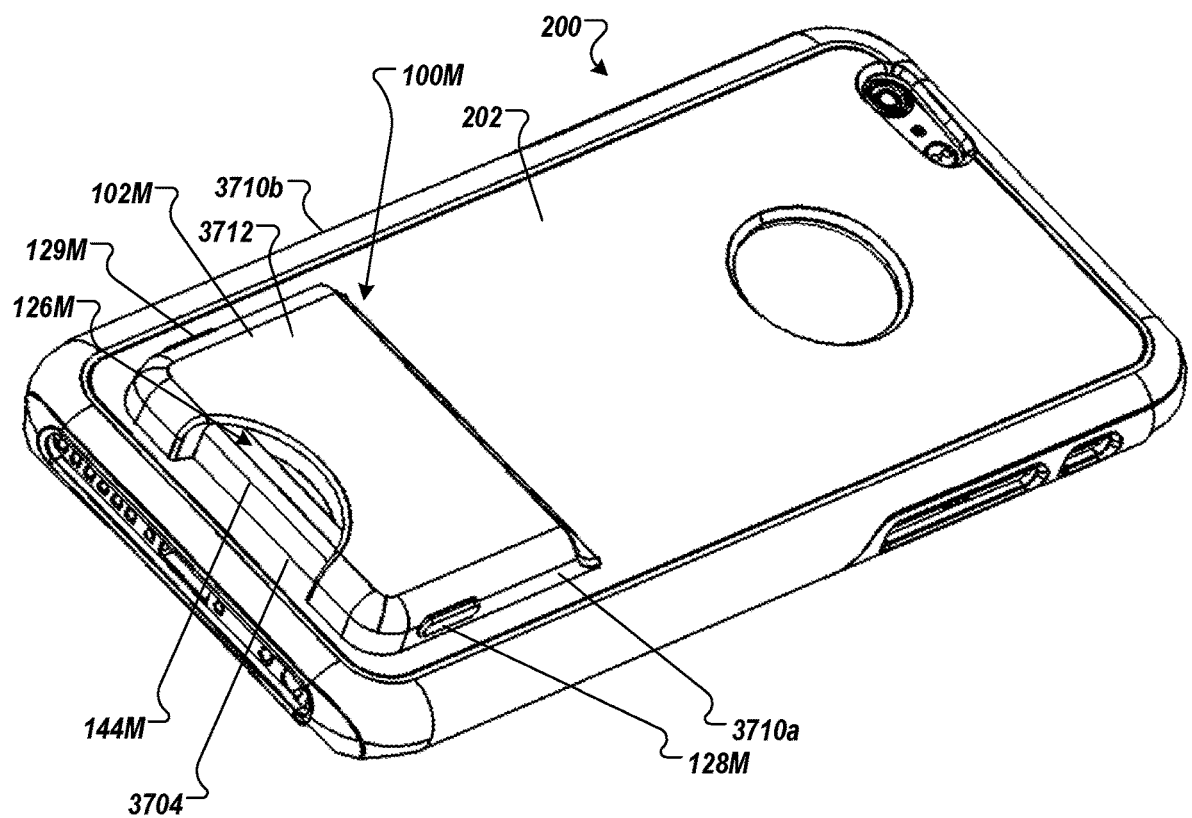

FIG. 37b shows the mobile phone accessory 100M adhered or affixed to a companion mobile device accessory 3701 (e.g., a wallet for holding identification cards, credit cards, cash, or the like) which in turn is adhered or affixed to the mobile device 200. However, the mobile phone accessory 100M can be adhered or affixed directly to the mobile device 200 without the need for, or use of, the companion mobile phone accessory 3701.

Figure 38:
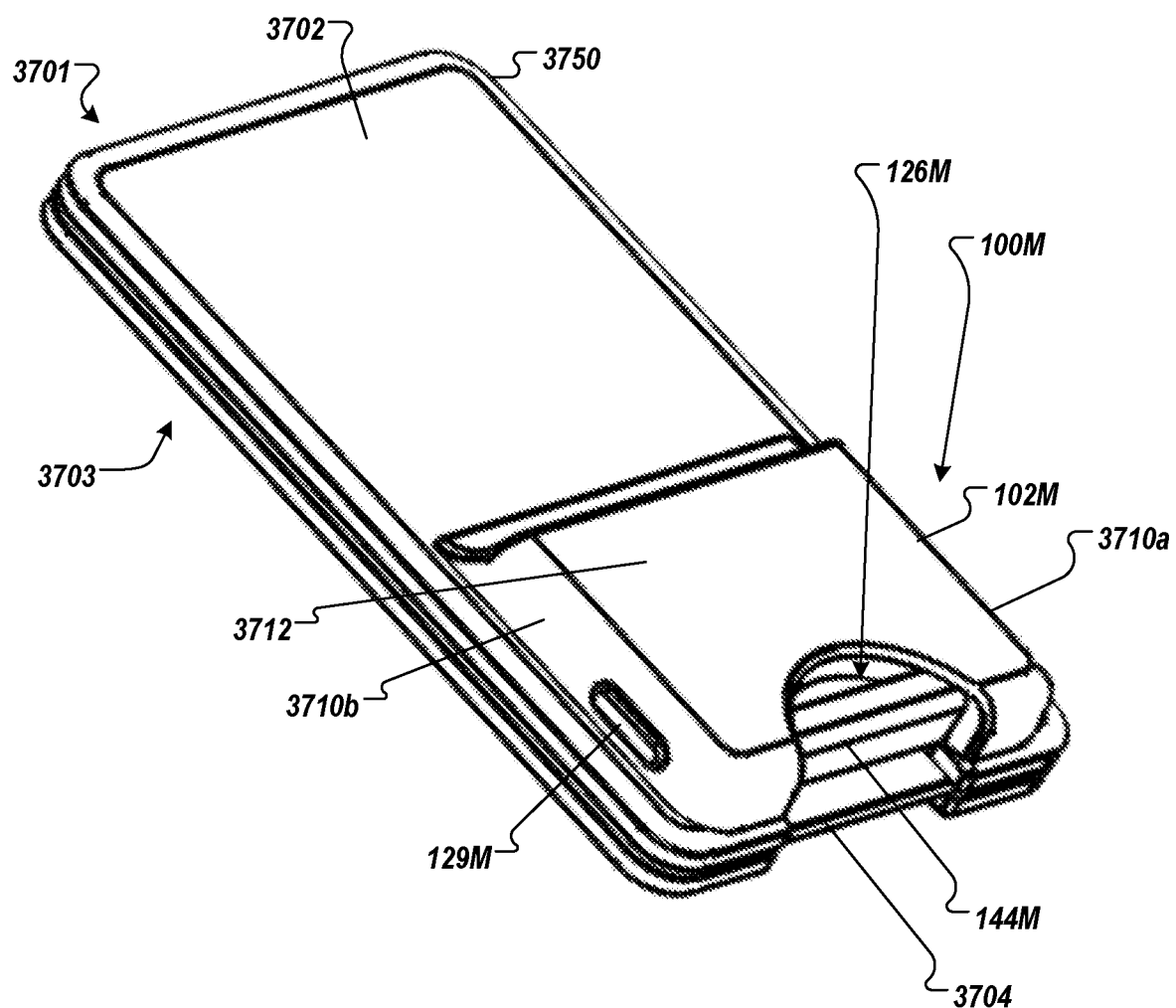
FIG. 38 illustrates a perspective view of the example personal safety device and companion mobile accessory of FIGS. 37a-37b.
Figure 39:
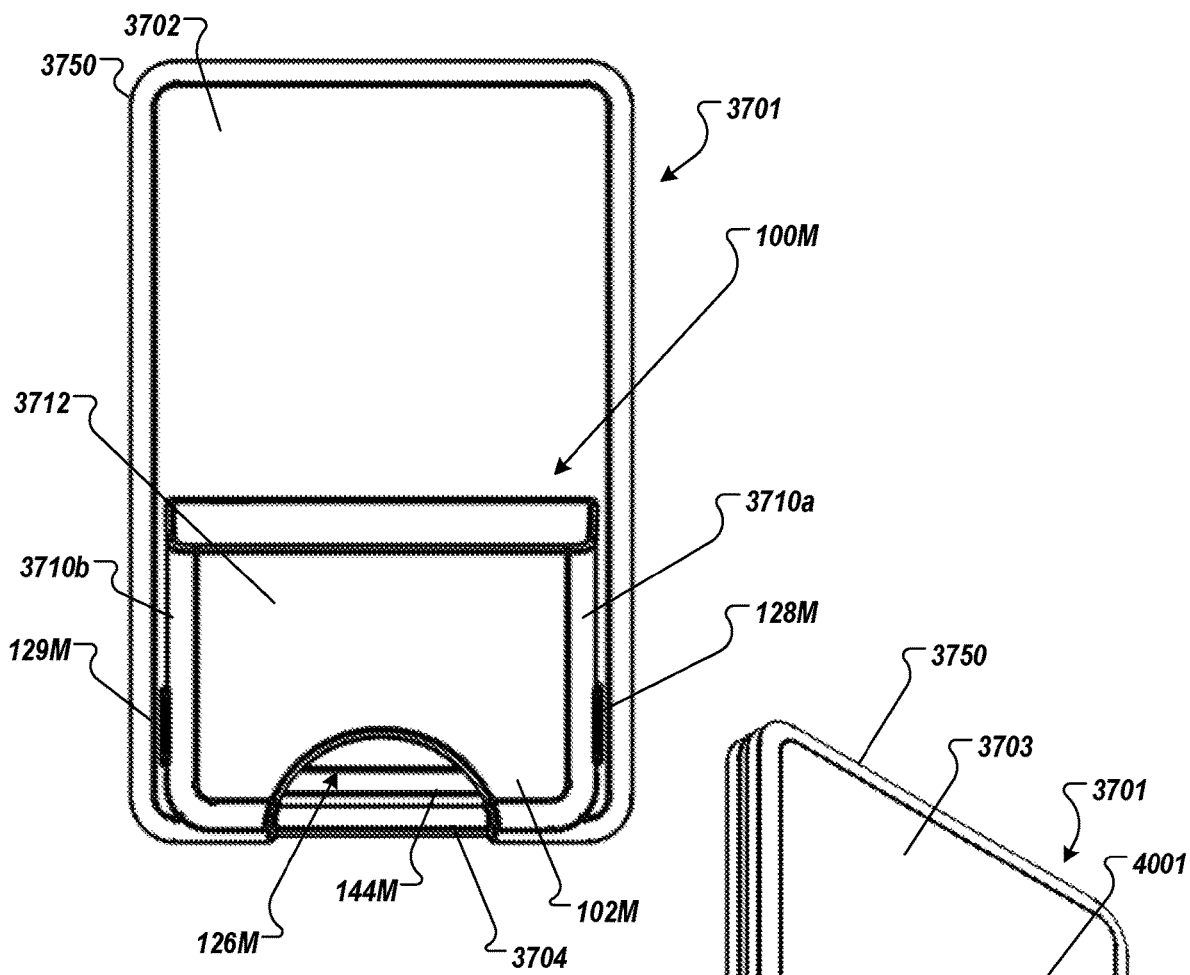
FIG. 39 illustrates a front view of the example personal safety device and companion mobile accessory of FIGS. 37a-37b.
Figure 40:
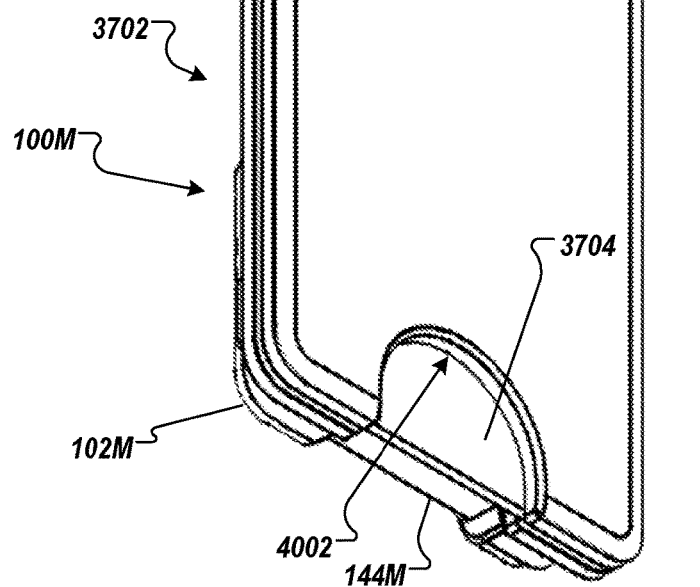
FIG. 40 illustrates a rear perspective view of the example personal safety device and companion mobile accessory of FIGS. 37a-37b.

FIGS. 38-39 show the mobile device accessory 100M attached to the companion mobile device accessory 3701 without the mobile device 200, whereas FIG. 40 shows the companion mobile device accessory 3701 alone.

Figure 41:
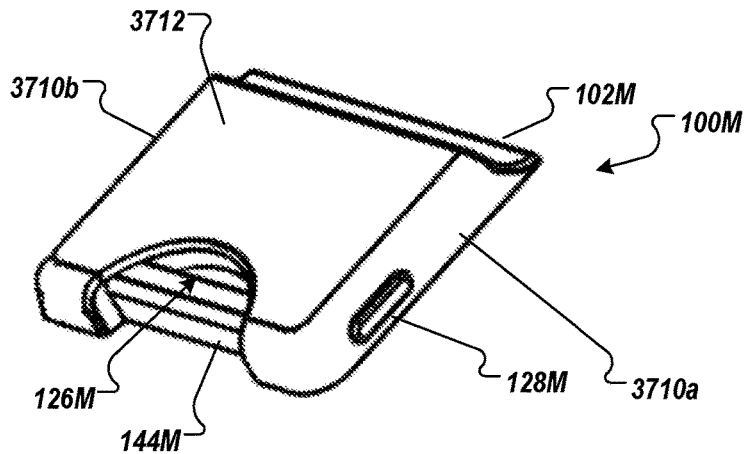
FIG. 41 illustrates a perspective front view of the example personal safety device of FIGS. 37a-37b.
Figure 42:
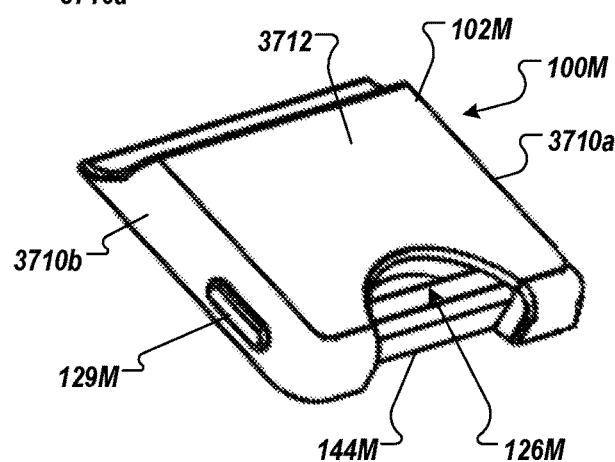
FIG. 42 illustrates an alternate perspective front view of the example personal safety device of FIGS. 37a-37b.
Figure 43:
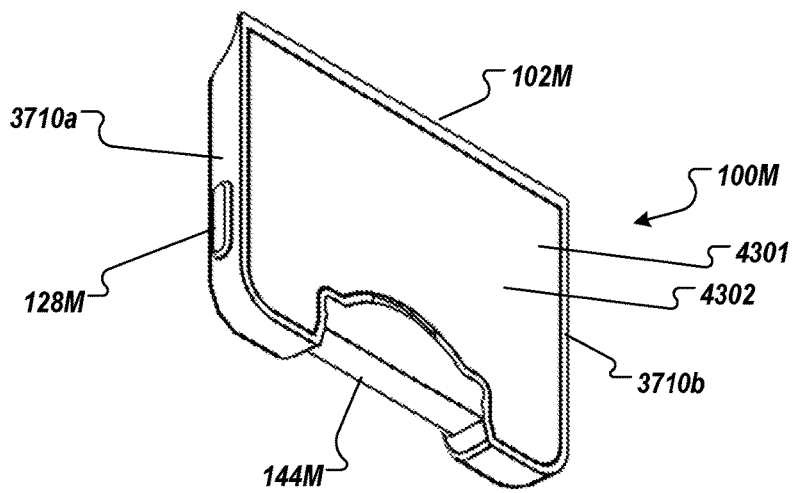
FIG. 43 illustrates a perspective rear view of the example personal safety device of FIGS. 37a-37b.
Figure 44:
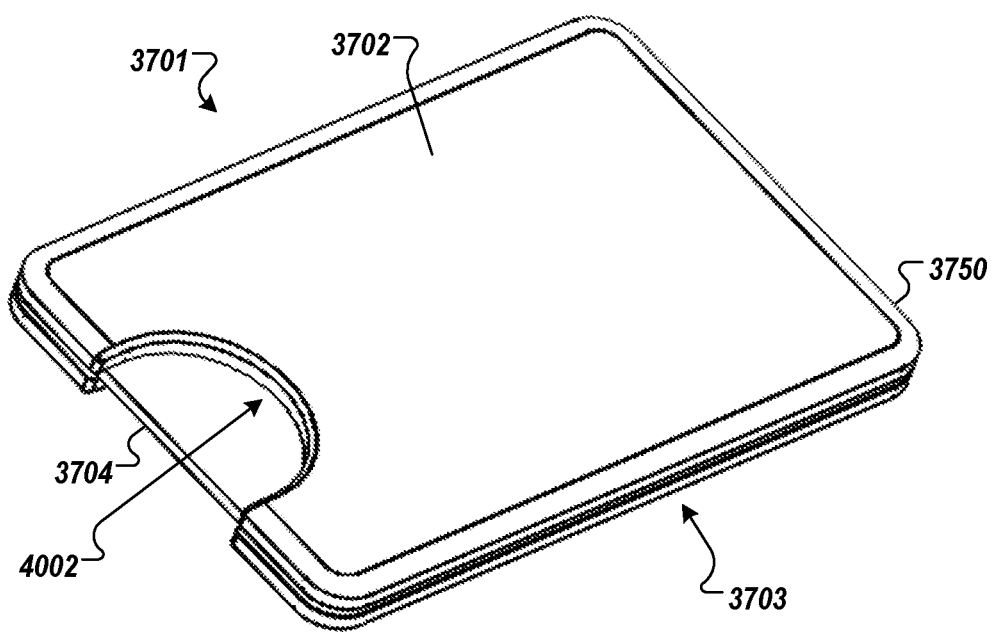
FIG. 44 illustrates a perspective front view of the companion mobile accessory of FIGS. 37a-37b.

FIGS. 41-43 show the mobile phone accessory 100M separate from the companion mobile device accessory 3701. In some implementations, the mobile phone accessory 100M can engage (e.g., adhere to) a portion of the mobile phone 200. In some implementations, the mobile phone accessory 100M can engage a portion of a mobile device accessory 3701 (which will be discussed further in the description of FIGS. 44-45). In some embodiments, the mobile phone accessory 100M and the mobile device accessory 3701 may be configured as two physically independent components that may be adhered or otherwise mechanically engaged to each other or may be used independently. In some embodiments, the mobile phone accessory 100M and the companion mobile device accessory 3701 may be configured as a combined unit (e.g., formed as a monolithic, unitary assembly having a shared housing).

Referring now to FIG. 43, a rear perspective view of the mobile phone accessory 100M is shown. A major face 4302 of the rear side of the housing 102M includes an adhesive pad 4301. In use, the adhesive pad 4301 can be contacted against (e.g., adhered to) a surface of the mobile phone 200 (e.g., the rear surface 202), or the surface 3702 of a mobile device accessory 3701, or any other appropriate surface.

Figure 45:
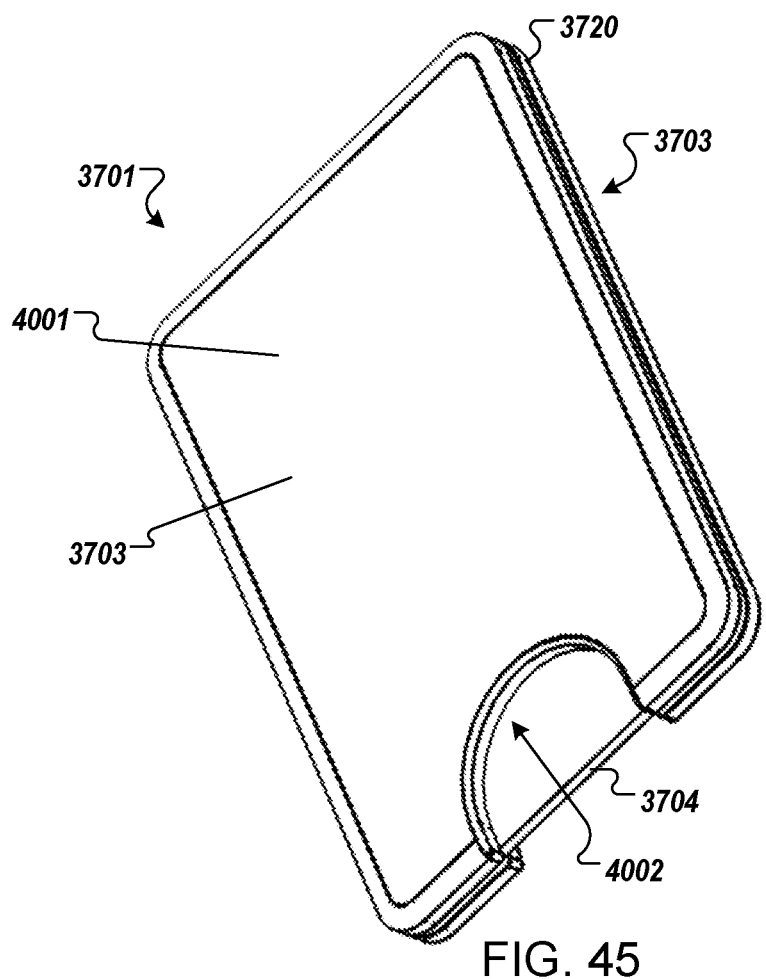
FIG. 45 illustrates a perspective rear view of the companion mobile accessory of FIGS. 37a-37b.

Referring now to FIGS. 40 and 45, rear perspective views of the mobile device accessory 3701 is shown. A rear side 3703 of the mobile device accessory 3701 includes an adhesive pad 4001. In use, the adhesive pad 4001 can be contacted against a surface of the mobile phone 200 (e.g., the rear surface 202), or any other appropriate surface.

Referring now primarily to FIGS. 36-40, 44, and 45, the companion mobile device accessory 3701 is shown. The companion mobile device accessory 3701 has a housing 4001 that defines a cavity 4002. The cavity 4002 is configured to removably retain one or more wallet-sized cards 3704, such as credit cards, identification cards (e.g., driver's license), loyalty cards, security access cards, folded cash, or any other appropriately sized items.

Figure 46:
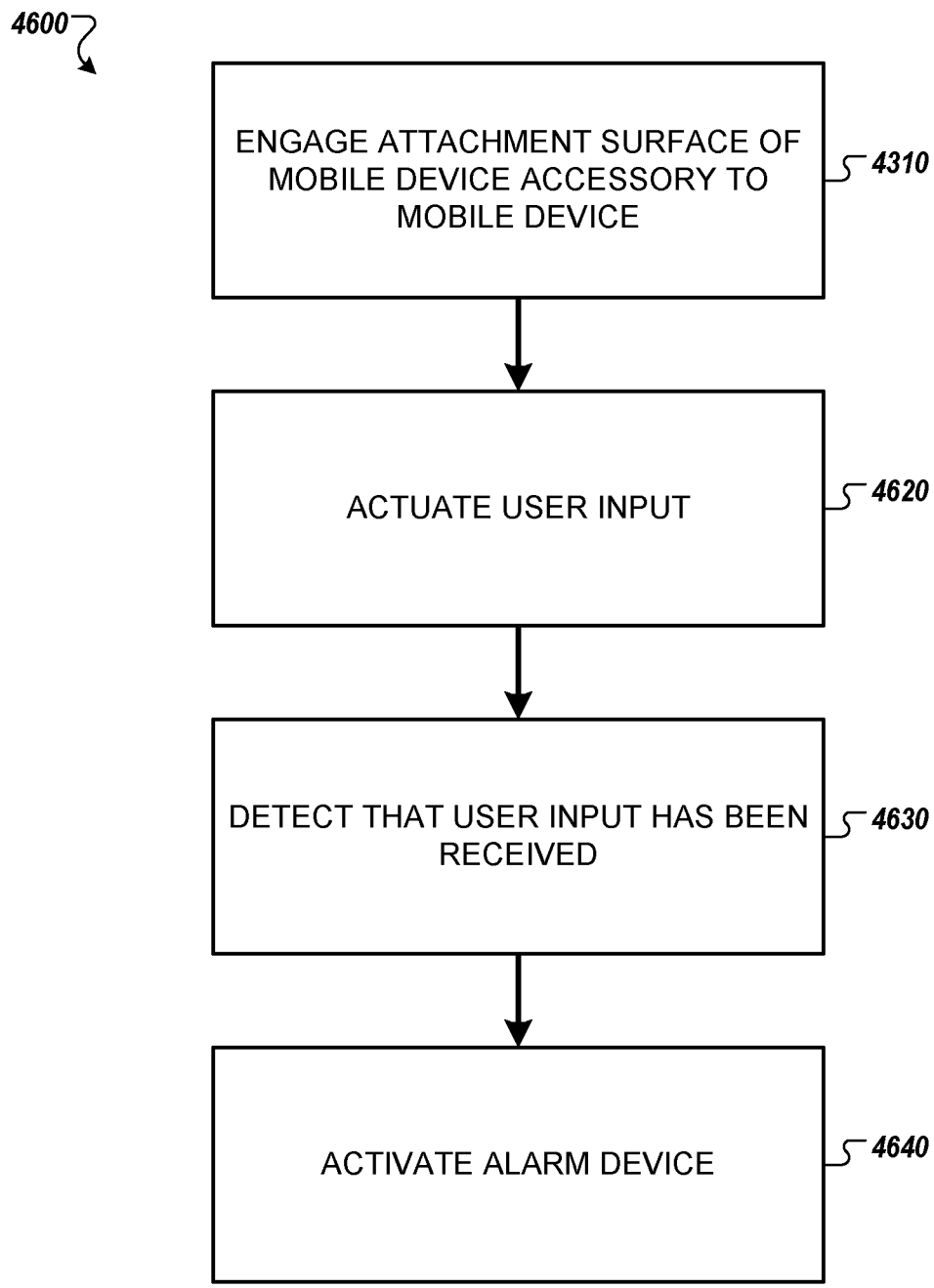
FIG. 46 is a flow chart of an example process for using an example mobile device accessory.

FIG. 46 is a flow chart of an example process for using an example mobile device accessory. In some implementations, the process 4600 can be performed using one or more of the example mobile device accessories 100A-100L of FIGS. 1-23, and 25-35, the personal safety device 300 of FIG. 23, and the mobile phone accessory 100M of FIGS. 37a-43.

At 4610, an attachment surface of a housing of a mobile device accessory is engaged to a mobile device. For example, the surface 4301 of the housing 102M may be configured to engage the rear surface 202 of the mobile phone 200. In another example, the adhesive pad 4302 shown in FIG. 43 can be used to secure (e.g., adhere) the mobile device accessory 100M to the mobile device accessory 3701.

At 4620, a user input of the mobile device accessory 100M is been received. For example, one or a combination of the buttons 128M, 129M may have been pressed by a user. In another example, the pull tab 114M may have been actuated or partly removed by a user.

At 4630, a separation sensor detects that, based on the received user input, the mobile device accessory 100M has been actuated. For example, the connectivity sensor 122 can determine that the pull tab 144M has been removed (at least partially), released or shifted, or that the button 128M and/or the button 129M has been pressed.

In some embodiments, the process 4600 can include detecting a mechanical separation of the housing and a lanyard affixed to a wearable component, the lanyard having a predetermined length and mechanically connecting the wearable component to the housing, the lanyard being mechanically separable from the housing when distance between the wearable component and the housing exceeds the predetermined length. For example, the pull tab 144M can be connected to the wearable component 120, and the connectivity sensor 122 can determine that the wearable component 120 has caused the pull tab 144M to move or at be at least partly removed from the housing 102M.

At 4640, an alarm device is activated based on detecting that the user input has been actuated. For example, the alarm device 112 of FIG. 7 can be activated. In some embodiments, activating the alarm device can include transmitting an alarm signal; and wherein the process 4600 can also include receiving, by mobile device, the alarm signal, and sending, by the mobile device and in response to the receiving the alarm signal, a predetermined communication to one or more predefined recipients. For example, the alarm device 112 of FIG. 7 can activate the communication interface 134 to communicate with the mobile phone 200. The mobile phone 200 may have a software application installed and executing thereupon, and the software application can be configured to react to the communication from the mobile device accessory 100M to cause the mobile phone to communicate with one or more predetermined recipients, and/or to emit an audible alarm or other sound. For example, the software application may be configured to initiate a call, send a text message, email, media file, media stream, location information (e.g., GPS data), captured audio and/or video, or any other appropriate information to one or more contacts previously identified by the user (e.g., family member, friend, neighbor, doctor, nurse, caregiver, welfare official, emergency services, 911). In some embodiments, the alarm device can be any appropriate circuit and/or mechanism that is configured for taking a predetermined action in response to a trigger, and does not necessarily require nor preclude that the alarm device is itself capable of generating an audible alarm.

In some embodiments, activating the alarm device can include activating an audio output component disposed within the housing and configured to emit an audible alert when activated. For example, the mobile device accessory 100M can include the audio output device 114 that can emit a siren, noise, prerecorded or synthesized spoken words or other sounds, or any other appropriate sound that is sufficiently loud enough to attract the attention of other nearby persons and/or repel an attacker. In some embodiments, activating the alarm device can include activating a visual output configured to emit an audible alert when activated. For example, the mobile device accessory 100M can include the light output device 116 that can emit a light or strobe to attract the attention of other nearby persons and/or repel an attacker.

In another configuration, the mobile device accessory need not be configured to be physically attachable to the mobile device, but rather may be implemented as a standalone unit that can be carried or worn by a user (e.g., as a wallet attachment or insert, key fob, bracelet, or the like), and which maintains a wireless communication connection between the accessory and the mobile device. In this configuration, other than the lack of physical attachment, the accessory can be designed and implemented to have any or all of the same features and/or functionality as the configuration in which the accessory is designed to be attached to the mobile device, as described above.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device accessory comprising:
 a housing;
 a user input mechanism configured to activate in response to input by a user and comprising:
   (i) a trigger component removably attachable to the housing and comprising a feature configured to facilitate removal of the trigger component from the housing, the feature comprising at least one of a slot, a void, or a recess; and
   (ii) a first button arranged on a first lateral surface of the housing, and a second button arranged on a second lateral surface opposite the first lateral surface, configured to activate in response to actuation by a user of a mobile device; and,
 a first communication circuit configured to activate and communicate with a second communication circuit in response to activation of the user input mechanism.

2. The mobile device accessory of claim 1, wherein the second communication circuit is configured to communicate with one or more cellular networks.

3. The mobile device accessory of claim 1, wherein the second communication circuit is in wired communication with the first communication circuit.

4. The mobile device accessory of claim 1, wherein the second communication circuit is disposed within the housing.

5. The mobile device accessory of claim 1, further comprising an alarm device comprising (i) an audio output device, (ii) a light output device, or (iii) both, configured to activate in response to activation of the user input mechanism.

6. The mobile device accessory of claim 1, wherein communication with the second communication circuit (i) causes an audible alarm to be emitted by an audio output device, or (ii) causes a software application to be executed on a mobile device, or (iii) both.

7. The mobile device accessory of claim 1, wherein the housing defines a cavity configured to retain one or more credit cards or identification cards.

8. The mobile device accessory of claim 1, wherein the housing is configured to mechanically engage a mobile device.

9. The mobile device accessory of claim 1, wherein a mobile device comprises the second communication circuit.

10. The mobile device accessory of claim 1, wherein the mobile device accessory is a standalone personal safety device configured to communicate with cellular networks.

11. The mobile device accessory of claim 1, wherein the first communication circuit is further configured communicate a position location, determined by a position location detector system, to the second communication circuit in response to activation of the user input mechanism.

12. The mobile device accessory of claim 11, wherein the mobile device accessory further comprises the position location detector system.

13. A mobile device accessory comprising:
 (a) a housing;
 (b) a user input mechanism configured to activate in response to input by a user and comprising:
   (i) a trigger component removably attachable to the housing and comprising a feature configured to facilitate removal of the trigger component from the housing, the feature comprising at least one of a slot, a void, or a recess; and
   (ii) a first button arranged on a first lateral surface of the housing, and a second button arranged on a second lateral surface opposite the first lateral surface, configured to activate in response to actuation by the user; and, (c) control circuitry to control operation of the mobile device accessory, the control circuitry at least partly disposed in the housing and configured to perform operations comprising:
  (i) establish a communications connection to communication circuitry;
  (ii) detect activation of the user input mechanism; and
  (iii) in response to the activation, communicate with the communication circuitry.

14. The mobile device accessory of claim 13, wherein the communication circuitry is configured to communicate with one or more cellular networks.

15. The mobile device accessory of claim 13, wherein the communication circuitry is in wired communication with the control circuitry.

16. The mobile device accessory of claim 13, wherein the communication circuitry is disposed within the housing.

17. The mobile device accessory of claim 13, further comprising an alarm device comprising (i) an audio output device, (ii) a light output device, or (iii) both, configured to activate in response to activation of the user input mechanism.

18. The mobile device accessory of claim 13, wherein communication with the communication circuitry (i) causes an audible alarm to be emitted by an audio output device, or (ii) causes a software application to be executed on a mobile device, or (iii) both.

19. The mobile device accessory of claim 13, wherein the housing defines a cavity configured to retain one or more credit cards or identification cards.

20. The mobile device accessory of claim 13, wherein the housing is configured to mechanically engage a mobile device.

21. The mobile device accessory of claim 13, wherein a mobile device comprises the communication circuitry.

22. The mobile device accessory of claim 13, wherein the mobile device accessory is a standalone personal safety device configured to communicate with cellular networks.

23. The mobile device accessory of claim 13, wherein the communication circuitry is further configured communicate a position location, determined by a position location detector system, in response to activation of the user input mechanism.

24. The mobile device accessory of claim 23, wherein the control circuitry further comprises the position location detector system.

25. A method of providing personal safety comprising:
detecting, by control circuitry of a mobile device accessory, user input based on activation of a user input mechanism comprising one or both of:
  (i) a trigger component removably attachable to a housing of the mobile device accessory and comprising a feature configured to facilitate removal of the trigger component from the housing, the feature comprising at least one of a slot, a void, or a recess; and
  (ii) a first button arranged on a first lateral surface of the housing, and a second button arranged on a second lateral surface opposite the first lateral surface, configured to activate in response to actuation by a user;
establishing a communications connection from the control circuitry to a communication circuit; and
communicating with the communication circuit.

26. The method of claim 25, wherein communicating with the communication circuitry comprises communicating with one or more cellular networks.

27. The method of claim 25, wherein the communication connection comprises a wired communications connection.

28. The method of claim 25, further comprising activating, in response to the detecting, an alarm device comprising (i) an audio output device, (ii) a light output device, or (iii) both.

29. The method of claim 25, further comprising (i) causing an audible alarm to be emitted by an audio output device, or (ii) causing a software application to be executed on a mobile device, or (iii) both.

30. The method of claim 25, further comprising:
determining, by a position location detector system, a position location of the mobile device accessory; and
communicating, in response to the detecting, the determined position location.

31. The method of claim 30, wherein the mobile device accessory further comprises the position location detector system.

* * * * *

UNITED STATES PATENT AND TRADEMARK OFFICE
CERTIFICATE OF CORRECTION

Page 1 of 1

PATENT NO. : 11,019,475 B2
APPLICATION NO. : 16/844783
DATED : May 25, 2021
INVENTOR(S) : Todd W. Baldree It is certified that error appears in the above-identified patent and that said Letters Patent is hereby corrected as shown below:

In the Claims

Column 22, Line 50, in Claim 11, after "configured" insert -- to --.

Column 23, Line 44, in Claim 23, after "configured" insert -- to --.

Column 24, Line 10, in Claim 25, delete "comprising one or both of:" and insert -- comprising: --.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*